(12) United States Patent
Kim et al.

(10) Patent No.: US 10,714,759 B2
(45) Date of Patent: Jul. 14, 2020

(54) CURRENT COLLECTOR-CATALYST MONOLITHIC THREE-DIMENSIONAL NANOFIBER NETWORK FOR LI-AIR BATTERIES AND MANUFACTURING METHOD THEREOF

(71) Applicant: Korea Advanced Institute of Science and Technology, Daejeon (KR)

(72) Inventors: Il-Doo Kim, Daejeon (KR); Ji Won Jung, Daejeon (KR); Ki Ro Yoon, Daejeon (KR); Dae Ho Yoon, Seoul (KR); Yong Joon Park, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 213 days.

(21) Appl. No.: 14/918,219

(22) Filed: Oct. 20, 2015

(65) Prior Publication Data

US 2016/0111730 A1 Apr. 21, 2016

(30) Foreign Application Priority Data

Oct. 21, 2014 (KR) ........................ 10-2014-0142877

(51) Int. Cl.
*H01M 4/86* (2006.01)
*H01M 4/90* (2006.01)
(Continued)

(52) U.S. Cl.
CPC ....... *H01M 4/8626* (2013.01); *H01M 4/8615* (2013.01); *H01M 4/8657* (2013.01);
(Continued)

(58) Field of Classification Search
CPC .. H01M 4/8626; H01M 4/8615; H01M 4/926; H01M 9/925; H01M 4/9083;
(Continued)

(56) References Cited

U.S. PATENT DOCUMENTS

2008/0176129 A1* 7/2008 Lee .................. B82Y 30/00
429/516
2012/0107582 A1* 5/2012 Metz .................. B82Y 30/00
428/209
2013/0327494 A1 12/2013 Mitchell et al.

FOREIGN PATENT DOCUMENTS

KR 20050048579 A 5/2005
KR 20130014650 A 2/2013

OTHER PUBLICATIONS

An, Geon-Hyoung, and Hyo-Jin Ahn. "Carbon nanofiber/cobalt oxide nanopyramid core-shell nanowires for high-performance lithium-ion batteries." Journal of Power Sources 272 (2014): 828-836.*
(Continued)

*Primary Examiner* — Milton I Cano
*Assistant Examiner* — Philip A. Stuckey
(74) *Attorney, Agent, or Firm* — Blank Rome LLP

(57) ABSTRACT

Disclosed is an electrode for lithium-air batteries without using a binder and a carbon additive and a method of manufacturing the same, and more specifically, provided is a nanofiber network-based current collector-catalyst monolithic porous air electrode which has an improved specific surface area and high air permeability as the energy density per weight is increased and the diameter, porosity, and thickness of the nanofibers are controlled by utilizing a significantly light polymer and carbon based material.

10 Claims, 20 Drawing Sheets

(51) Int. Cl.
    H01M 4/92      (2006.01)
    H01M 4/88      (2006.01)
    H01M 8/18      (2006.01)
    H01M 10/0525   (2010.01)
    H01M 12/08     (2006.01)

(52) U.S. Cl.
    CPC ....... H01M 4/8807 (2013.01); H01M 4/8828 (2013.01); H01M 4/8867 (2013.01); H01M 4/90 (2013.01); H01M 4/9016 (2013.01); H01M 4/9041 (2013.01); H01M 4/9075 (2013.01); H01M 4/9083 (2013.01); H01M 4/92 (2013.01); H01M 4/925 (2013.01); H01M 4/926 (2013.01); H01M 8/186 (2013.01); H01M 10/0525 (2013.01); H01M 12/08 (2013.01); *H01M 2004/8689* (2013.01); *H01M 2220/10* (2013.01); *H01M 2220/20* (2013.01); *H01M 2220/30* (2013.01); *Y02E 60/128* (2013.01)

(58) Field of Classification Search
    CPC .. H01M 4/9075; H01M 4/9041; H01M 12/08; H01M 4/8657; H01M 10/0525; H01M 8/186; H01M 4/8867; H01M 4/8828; H01M 4/8807; H01M 4/92; H01M 4/90; H01M 4/9016; H01M 2220/30; H01M 2220/20; H01M 2220/10; H01M 2004/8689; Y02E 60/128
    See application file for complete search history.

(56) References Cited

OTHER PUBLICATIONS

J. Wu, et al., "Facile Synthesis and Evaluation of Nanofibrous Iron-Carbon Based Non-Precious Oxygen Reduction Reaction Catalysts for Li—$O_2$ Battery Applications", The Journal of Physical Chemistry, American Chemical Society, 2012, vol. 116, pp. 9427-9432.

D. S. Kim, et al., "Effect of Multi-Catalysts on Rechargeable Li-air Batteries", Journal of Alloys and Compounds, www.elsevier.com/locate/jalcom; vol. 591, 2014, pp. 164-169.

Won-Hee Ryu, et al., Bifunctional Composite Catalysts Using $Co_3O_4$ Nanofibers Immobilized on Nonoxidized Graphene Nanoflakes for High-Capacity and Long-Cycle Li—$O_2$Batteries, Nano Letters, American Chemical Society, 2013, vol. 13, No. 9, pp. 4190-4197.

Y. Yang, et al., "Polypyrrole-Decorated Ag—$TiO_2$ Nanofibers Exhibiting Enhanced Photocatalytic Activity under Visible-Light Illumination", Applied Materials & Interfaces, www.acsami.org; American Chemical Society, 2013, vol. 5, No. 13, pp. 6201-6207.

Y. Li, et al., "Tuning Electrochemical Performance of Si-based Anodes for Lithium-ion Batteries by Employing Atomic Layer Deposition Alumina Coating", Journal of Materials Chemisty A; The Royal Society of Chemistry; 2014, vol. 2, No. 29, pp. 11417-11425.

Bo-Wen Huang, et al., "Nanofibrous MnNi/CNF Composite Catalyst for Rechargeable Li—$O_2$ Cell", Journal of the Electrochemical Society, 2013, vol. 160, No. 8, pp. A1112-A1117.

Björn Carlberg, et al., "Surface-Confined Synthesis of Silver Nanoparticle Composite Coating on Electrospun Polyimide Nanofibers", Small, www.small-journal.com; 2011, vol. 7, No. 21, pp. 3057-3066.

J. Park, et al., "Bimodal Mesoporous Titanium Nitride/Carbon Microfibers as Efficient and Stable Electrocatalysts for Li—$O_2$ Batteries", Chemistry of Materials, pubs.acs.org/cm; American Chemical Society, 2013, vol. 25, No. 19, pp. 3779-3781.

Pelissari et al., "Isolation and characterization of cellulose nanofibers from banana peels", Cellulose, 2014, pp. 417-432, 21.

\* cited by examiner

CURRENT COLLECTOR-CATALYST MONOLITHIC THREE-DIMENSIONAL NANOFIBER NETWORK FOR LI-AIR BATTERIES AND MANUFACTURING METHOD THEREOF

CROSS-REFERENCE TO RELATED APPLICATION

This application claims priority from and the benefit of Korean Patent Application No. 10-2014-0142877, filed on Oct. 21, 2014, the disclosure of which is incorporated herein in its entirety by reference.

BACKGROUND

Embodiments of the inventive concepts described herein relate to an electrode (air electrode) for lithium-air batteries and a method of manufacturing the same, and more particularly, relate a porous air electrode including a catalyst layer that is uniformly coated on the surface of individual conductive nanofibers constituting a nanofiber network having a fabric-like structure and a manufacturing method thereof.

Embodiments of the inventive concepts described herein also provide a multilayer porous air electrode having a single-layer or multilayer shell structure that is uniformly and continuously coated on the surface of the individual nanofibers and a manufacturing method thereof.

A porous air electrode obtained in embodiments of the inventive concepts has structures of (1) a single-layered core (non-conductive nanofiber)/shell (a conductive catalyst layer), (2) a multilayered core (non-conductive nanofiber)/shell (first conductive layer/second catalyst layer), (3) a single-layered core (conductive carbon nanofiber)/shell (conductive catalyst layer) or (4) a single-layered core (conductive carbon nanofiber)/shell (non-conductive catalyst layer), and thus an air electrode using current collector-catalyst monolithic nanofiber network exhibiting both current collecting and catalytic properties is provided. The porous air electrode is light, and has a large specific surface area with open structure allowing the electrolyte to penetrate easily through the pores of the nanofibers, and thus a lithium-air battery exhibiting significantly improved energy density and cycle-life characteristics is provided.

The development of sustainable and alternative energy has increasingly received attention due to the environmental problems such as an increase in energy consumption and the use of fossil fuels, and a secondary battery that can produce and store electrical energy through the charge and discharge of electricity is regarded as the most realistic solution. There are many kinds of secondary batteries like lead-acid batteries, nickel-cadmium (Ni—Cd) batteries, nickel-metal hydride (NiMH) batteries, and lithium ion (Li-ion) batteries that are currently commercialized, and in particular, lithium ion (Li-ion) batteries are most widely used in small-sized electronic devices such as mobile phones or laptop computers. However, as the secondary battery market has expanded, the development on a high-capacity energy storage device beyond the performance limit of the existing lithium-ion batteries, which can support a high output power as power sources for application in an electric vehicle (EV) or high-capacity electrical energy storage (EES) device, has been greatly desired in the recent.

Lithium-air (Li-air) batteries have recently received much attention as a next-generation energy storage system since they use lithium as the negative electrode and light oxygen as the positive electrode so as to have a much higher energy density than a lithium-ion batteries, and they use oxygen in the air as the fuel so as to have an advantage of being eco-friendly. In order to commercialize the Li-air batteries, however, the following elemental technologies are required to be solved especially in regard to the positive electrode (air electrode) which provides reaction sites to form and decompose the solid phase lithium oxide ($Li_2O_2$) as a reaction product.

First, the current collector which occupies a large weight ratio in the entire air electrode (energy density is inversely proportional to the weight or unit area of the electrode) should be lighter and the reaction area in the same size should be wide to have a large specific capacity (energy density is the multiplication of the driving voltage and the specific capacity) to obtain a high energy density. In addition, as the current collector of the commercial lithium-ion battery electrodes, a two-dimensional plate electrode such as a foil is produced from a metallic material such as copper, aluminum, nickel, or stainless steel and used, but the current collector of a Li-air batteries should have a porous structure in order to maintain a high permeability of the electrolyte containing lithium ions and an easy diffusivity of oxygen gases. Accordingly, a method to secure the current collector having an improved current density through an increase in specific surface area induced by porous and finely patterned metal mesh including various thicknesses of nickel, titanium, platinum, and the like has been attempted. As an example of this, a Li-air battery system using a metal mesh as the positive electrode has been studied in general. However, in the case the metal mesh, it has large interval between the wires from tens to hundreds μm due to the limitation of commercialized technique, and thus the specific surface area or the volumetric capacity is low. In addition, the weight of the metallic material is heavy, and thus the gravimetric energy density of the battery itself decreases when a metal mesh having a thick diameter is used. Hence, it is important to form the size of the pores in the metal mesh in the range of tens nm to several μm, and it is preferable to restrict the diameter of the individual wires constituting the metal mesh to be less than about 1 μm as well. In the case of a usual metal mesh, it may be broken or deformed due to a weak strength and the manufacture thereof is also difficult when the thickness thereof decreases to less than 1 μm, and thus it is important to select a material having an outstanding flexibility, excellent mechanical strength and lightweight property for fabricating a current collector.

Next, it is also important to select the catalysts to facilitate the OER (oxygen evolution reaction) and ORR (oxygen reduction reaction) for having long-cycle-life of Li-air batteries. Unlike a lithium-ion batteries, lithium and oxygen meet to form solid lithium oxide ($Li_2O$ or $Li_2O_2$) during discharge in non-aqueous Li-air batteries, and such the reaction products should be reversibly decomposed into lithium and oxygen during charge, and thus the use of efficient catalysts is essential for achieving high round trip efficiency in repeated charging and discharging steps. Among the well-known catalysts, gold and platinum exhibit the best catalytic performance, but these even decompose the electrolyte during charge and discharge, resulting in poor cycle-life of the Li-air batteries. In addition, the high price of the noble metal catalysts such as gold or platinum still inhibit the commercialization of the Li-air batteries in the large scale EV application in which the large amount of the catalysts are required. So, the use an inexpensive catalyst that can maintain a stable structure while having excellent catalytic activities is required, and a catalyst material of binary transition metal oxides such as ruthenium oxide ($RuO_2$), iridium oxide ($IrO_2$), cobalt oxide ($Co_3O_4$), or manganese oxide ($MnO_2$) or a perovskite-based three-component oxides such as lanthanum-manganese oxide ($LaMnO_3$) or lanthanum cobalt oxide ($LaCoO_3$) has been widely studied. Besides oxides above, nitride- or carbide-based catalysts including titanium nitride (TiN) or titanium carbide (TiC) have been recently extensively studied. However, the cycle-life of the batteries using such catalysts is significantly low to have less than 100 cycles as reported so far. Hence, it is important to provide a catalyst capable of providing more stable reactivity and a three-dimensional current collector having a porous structure for effective penetration of oxygen and lithium ions at the same time for the development of Li-air batteries exhibiting excellent long-cycle-life characteristics.

Recently, carbon-based materials such as carbon black, Super P, Ketjen black, carbon nanotubes (CNTs), or graphene are widely used in the air electrode for the purpose of providing a large specific surface area and high electrical conductivity. However, the carbon-based materials produce a side reaction product such as lithium carbonate ($Li_2CO_3$) in the electrolyte during repeated charge and discharge process. It is required to apply a significantly high voltage (4.2 V or higher based on reduction potential of lithium) to decompose such a side reaction product, but it also cause the electrolyte decomposition in such a high voltage condition.

Finally, it is desired to secure the mass production and the price competitiveness for the commercialization of the Li-air batteries, and all the positive electrode materials are desired to have high physical or chemical stability so that they are not deformed or subjected to corrosion during the charge and the discharge reaction. A development of a new air electrode that both a current collector and a catalyst are integrated is desired to solve all the above problems.

SUMMARY

Embodiments of the inventive concepts have been made to solve the problems of the prior art and provide a three-dimensional porous current collector-catalyst monolithic nanofiber network electrode for the manufacture of a lithium-air electrode having a high capacity and a long-cycle-life in a large scale. In order to achieve this, a binder- and carbon-free nanofiber network-based current collector-catalyst monolithic porous air electrode which has an improved specific surface area and high air permeability is provided by controlling a diameter, porosity, and thickness of the nanofibers.

More specifically, in a case of the individual nanofibers constituting the fabric-like nanofiber network are a non-conductive, a porous air electrode including a conductive catalyst layer that is uniformly coated on the surface of the individual nanofibers, namely, a single-layered core (non-conductive nanofiber)/shell (first conductive catalyst layer) structure is provided. In addition, embodiments of the inventive concepts provide a multilayered porous air electrode including a first coating layer (conductive layer) and a second coating layer (catalyst layer) which are uniformly and continuously coated on the surface of the individual nanofibers, namely, a core (non-conductive nanofiber)/shell (first conductive layer/second catalyst layer) structure is provided. Here, the first coating layer (conductive layer) is positioned below the second coating layer (catalyst layer), and thus a continuously layered shell (first conductive layer/second catalyst) can be achieved.

In addition, in a case of the individual nanofibers constituting the fabric-like nanofiber network are conductive carbon nanofibers, a porous air electrode including a conductive catalyst layer or a catalyst layer that is uniformly coated on the surface the individual nanofibers, namely, a single-layered core (conductive carbon nanofiber)/shell (conductive catalyst layer) structure or a single-layered core (conductive carbon nanofiber)/shell (non-conductive catalyst layer) structure is provided.

Embodiments of the inventive concepts may provide a three-dimensional nanofiber network-based current collector-catalyst monolithic air electrode exhibiting both current collecting and catalytic properties with a maximized reaction sites at the same time.

A nanofiber network air electrode having a core-shell structure according to an aspect of the inventive concept in order to achieve the above objects may provide a porous nanofiber network electrode having void spaces between randomly distributed nanofibers.

First, in a case of the core is a non-conductive polymer nanofiber in the nanofiber network electrode, the nanofiber network electrode is an air electrode which has a conductive catalyst layer as the shell and a single-layered core (non-conductive nano fiber)/shell (first conductive catalyst layer) structure. At this time, the conductive catalyst layer is a single-layered film which exhibits electrical conductivity for the both current collecting and catalytic properties at the same time.

Second, in a case of the core is a non-conductive polymer nanofiber in the nanofiber network electrode, the nanofiber network electrode is a multilayered porous air electrode including first coating layer (conductive layer or conductive thin film layer) and the second coating layer (second catalyst layer composed of non-conductive catalyst layer) as the shell and has a core (non-conductive nanofiber)/shell (first conductive thin film layer/second catalyst layer) structure.

Third, in a case of the core is a conductive carbon nanofiber in the nanofiber network electrode, the shell may be composed of a conductive catalyst layer or a single catalyst layer, and the nanofiber network electrode has a core (conductive carbon nanofiber)/shell (conductive catalyst layer) structure or a core (conductive carbon nanofiber)/shell (non-conductive catalyst layer) structure. Accordingly, in the current collector-catalyst monolithic air electrode having a conductive carbon nanofiber as the center layer (core), the first catalyst layer constituting the shell may be a conductive or non-conductive catalyst layer. At this time, the conductive or non-conductive catalyst layer should be film type to prevent the conductive carbon nanofiber to be directly exposed to the electrolyte.

Here, as the nanofiber network material, a material which can maintain the physical or chemical stability when driving the battery and has a light weight and flexibility as an air electrode may be used without limitations.

Here, in the nanofiber network, a non-conductive material composed of a polymer or a conductive carbon nanofiber material composed of a carbon-based material may be selectively used without limitations.

Here, the non-conductive nanofiber may be composed of one kind or two or more kinds of polymers of polyurethane, a polyurethane copolymer, cellulose acetate, cellulose, acetate butyrate, a cellulose derivative, polymethyl methacrylate (PMMA), polymethyl acrylate (PMA), a polyacrylic copolymer, a polyvinyl acetate copolymer, polyvinyl acetate (PVAc), polyvinylpyrrolidone (PVP), polyvinyl alcohol (PVA), polyfurfuryl alcohol (PPFA), polystyrene (PS), a polystyrene copolymer, polyethylene oxide (PEO), polypropylene oxide (PPO), a polyethylene oxide copolymer, a polypropylene oxide copolymer, polycarbonate (PC), polyvinyl chloride (PVC), polycaprolactone, polyvinyl fluoride, a polyvinylidene fluoride copolymer, polyimide, polyacrylonitrile (PAN), polyvinyl alcohol (PVA), polycarbonate (PC), polyaniline (PANI), polyvinyl chloride (PVC), poly (vinylidene fluoride) (PVDF), polyethylene terephthalate (PET), polypropylene (PP), or polyethylene (PE).

Here, a polyimide nanofiber may be preferably used among various polymer materials because the subsequent heat treatment or a high-temperature deposition process (200° C. or higher) is often required to deposit the conductive layer or the catalyst layer on the non-conductive polymer nanofiber web. Polyimide is a thermally stable polymer, so it has high thermal stability.

Here, the conductive nanofiber may include a conductive carbon-based nanofiber that is produced through carbonization of the polymer nanofiber and thus has a high electrical conductivity.

Here, the nanofiber network may be composed of a nanofiber having a diameter in a range of 50 nm to 3 μm and a length in a range of 100 μm or longer.

Here, the pores included between the individual nanofibers constituting the nanofiber network may have an average pore size in a range of 100 nm to 200 μm.

Here, the nanofiber network air electrode having a core-shell structure may have a thickness in a range of 10 to 500 μm.

Here, the nanofibers constituting the nanofiber network may be scattered in an ordered form. In other words, the nanofiber network may have a grid-shaped nanofiber network structure.

Here, the conductive layer (conductive thin film layer) is not limited to a particular material as long as a material solves the mechanical and electrical contact problem that may be caused between the nanofiber and the catalyst layer and provides a sufficient electrical conductivity as a current collector.

Here, the conductive layer (conductive thin film layer) may have a thickness in a range of 20 to 500 nm.

Here, the conductive layer may be composed of one or two or more metals of nickel (Ni), tin (Sn), indium (In), lead (Pb), zinc (Zn), cadmium (Cd), gold (Au), silver (Ag), platinum (Pt), palladium (Pd), copper (Cu), iron (Fe), aluminum (Al), or stainless steel, or a single material or two or more layered materials having a sufficient electrical conductivity such as Indium oxide ($In_2O_3$), tin-doped indium oxide (ITO; $Sn:In_2O_3$), zinc oxide (ZnO), aluminum-doped zinc oxide (AZO; Al:ZnO), tin oxide ($SnO_2$), or fluorine-doped tin oxide (FTO; $F:SnO_2$) may be used without limitations.

Here, as the method for coating the conductive layer, a metal deposition method capable of conducting continuous R2R (roll-to-roll) deposition in a large scale, a method to coat using a solution containing a metal precursor or an ink, or a wet plating method including electroplating and electroless-plating may be used, physical vapor deposition (PVD) including sputtering, pulsed laser deposition, and vacuum evaporation may be used, chemical vapor deposition (CVD) including metal organic chemical vapor deposition, plasma enhanced chemical vapor deposition, and atomic layer deposition may be used, or two or more methods among these may be used together.

Here, the conductive catalyst layer constituting the shell includes a film layer in the form of a thin film (including a structure in the form of a film layer) and may further include a surface in which a catalyst in the form of nanoparticles or a nanosheet is coupled to the surface of the conductive nanofiber layer.

Here, in a case in which the conductive catalyst layer is a film layer, it may have a thickness in a range of 20 to 500 nm. In a case of the conductive catalyst layer is a nanoparticle catalyst, it may be a nanoparticle catalyst having a size distribution in a range of 1 to 20 nm.

Here, the conductive catalyst layer is a material which exhibits electrical conductivity and catalytic properties at the same time and may be a metal including at least one of platinum (Pt), gold (Au), silver (Ag), palladium (Pd), ruthenium (Ru), or iridium (Ir), an oxide including at least one of ruthenium oxide ($RuO_2$), iridium oxide ($IrO_2$), strontium-ruthenium oxide ($SrRuO_3$), or lanthanum-nickel oxide ($LaNiO_3$), or a carbide including titanium carbide (TiC), or a nitride including at least either of titanium nitride (TiN) or tantalum nitride ($Ta_2N_5$), and it is not limited to a particular material as long as a material has an electrical conductivity enough to be used as a current collector and excellent catalytic activity at the same time.

Here, as the non-conductive catalyst layer refers to a normal and non-conductive catalyst layer which does not exhibit high electrical conductivity, and a material which has a function to lower the overvoltage caused when the oxygen reduction reaction (ORR) and the oxygen evolution reaction (OER) take place in the air electrode during discharge may be used without limitations.

Here, in the case of using a non-conductive nanofiber as the center layer (core), a conductive layer may be formed on the surface of a non-conductive nanofiber as the first coating layer and the second catalyst layer of a non-conductive normal catalyst layer may be coated thereon as the second coating layer.

Here, in the case of using a conductive nanofiber, for example, a conductive carbon nanofiber as the center layer (core), the second catalyst layer may be directly coated on the surface of the conductive carbon nanofiber.

Here, the second catalyst layer may be formed in the form of nanoparticles, a nanosheet, or a nanofilm. In a case in which the second catalyst layer is a film layer, it may include a non-conductive catalyst layer having a thickness range from 2 to 50 nm. In addition, in a case of the second catalyst layer is formed in the form of nanoparticles, it may include a nanoparticle catalyst having a size distribution from 1 to 20 nm.

Here, the material of the second catalyst layer may include at least either of a two-component system metal oxide including cobalt oxide ($CO_3O_4$), manganese oxide ($MnO_2$), or nickel oxide (NiO) or a three-component system metal oxide including at least one of lanthanum-manganese oxide ($LaMnO_3$), lanthanum cobalt oxide ($LaCoO_3$), or lanthanum-iron oxide ($LaFeO_3$).

Here, as the method for coating the catalyst layer, a metal deposition method capable of conducting continuous R2R (roll-to-roll) deposition in a large scale, a method to coat using a solution containing a metal precursor or an ink, or a wet plating method including electroplating and electroless-plating may be used, physical vapor deposition (PVD) including sputtering, pulsed laser deposition, and vacuum evaporation may be used, chemical vapor deposition (CVD) including metal organic chemical vapor deposition, plasma enhanced chemical vapor deposition, and atomic layer deposition may be used, or two or more methods among these may be used together.

The nanofiber network based air electrode may have a layered architecture formed by stacking, folding, or rolling a plurality of the nanofiber network.

Here, the volume of the layered structure may be in a range of 1 $cm^3$ to 1 $m^3$.

A battery using the nanofiber network electrode according to an aspect of the inventive concept are equipped with the nanofiber network air electrode according to the inventive concept, and the nanofiber network air electrode may be used as a current collector for a battery including lithium-ion batteries, fuel cells, photochemical cells, and solar cells in addition to Li-air batteries.

The method of manufacturing a nanofiber network air electrode according to another aspect of the inventive concept includes a method of manufacturing a nanofiber network air electrode which includes (a) a step of forming a porous non-conductive nanofiber network having a void space formed between the nanofibers which are ejected from a solution containing a polymer dissolved, i.e., electrospinning solution, therein as a center layer (core); (b) a step of forming a single-layered nanofiber network structure of (non-conductive nanofiber/conductive catalyst layer) by coating a conductive catalyst layer on a surface of the non-conductive nanofiber (core) as the first coating layer; (c) a step of forming a double-layered nanofiber network structure of (non-conductive nanofiber/first conductive layer/second catalyst layer) by forming a conductive layer on the surface of the non-conductive nanofiber (core) as the first coating layer and continuously forming a catalyst layer thereon as the second coating layer; and (d) a step of stacking the single-layered nanofiber network. Only either of the step (b) or the step (c) may be included, and the step (d) may be selectively included.

In addition, the method of manufacturing a nanofiber network air electrode having a core-shell structure according to still another aspect of the inventive concept includes a method of manufacturing a nanofiber network air electrode which includes (a) a step of forming a porous conductive carbon nanofiber network or a conductive nanofiber network as the core (center layer); (b) step of forming a single-layer nanofiber network structure of (conductive carbon nanofiber/conductive catalyst layer) by coating a conductive catalyst layer on the surface of the conductive carbon nanofiber (core) as the first coating layer; (c) a step of forming a single-layer nanofiber network structure of (conductive carbon nanofiber/first catalyst layer of non-conductive normal catalyst layer) by forming a catalyst layer on the surface of the conductive carbon nanofiber (core) as the first coating layer; and (d) a step of stacking the nanofiber network having the conductive carbon nanofiber/conductive catalyst layer or conductive carbon nanofiber/first non-conductive catalyst layer. In this case as well, only either of the step (b) or the step (c) may be included, and the step (d) may be selectively included.

In the current collector-catalyst monolithic air electrode, in the case of using the conductive carbon nanofiber as the center layer (core) of the current collector, a conductive catalyst layer or a non-conductive normal catalyst layer may be used as the catalyst layer that is coated on the surface of the individual nanofibers, and the catalyst material is not particularly limited.

Here, the conductive carbon nanofiber network in the step (a) may be formed using an electrospinning method.

Here, when conducting the electrospinning method, a polymer nanofiber may be produced by applying a voltage in a range of 8 to 30 kV and ejecting a solution containing the metal precursors and polymers therein at a rate of 10 to 300 μL per minute. As the polymer, one kind or two or more kinds of polymers of polyurethane, a polyurethane copolymer, cellulose acetate, cellulose, acetate butyrate, a cellulose derivative, polymethyl methacrylate (PMMA), polymethyl acrylate (PMA), a polyacrylic copolymer, a polyvinyl acetate copolymer, polyvinyl acetate (PVAc), polyvinylpyrrolidone (PVP), polyvinyl alcohol (PVA), polyfurfuryl alcohol (PPFA), polystyrene (PS), a polystyrene copolymer, polyethylene oxide (PEO), polypropylene oxide (PPO), a polyethylene oxide copolymer, a polypropylene oxide copolymer, polycarbonate (PC), polyvinyl chloride (PVC), polycaprolactone, polyvinyl fluoride, a polyvinylidene fluoride copolymer, polyimide, polyacrylonitrile (PAN), polyvinyl alcohol (PVA), polycarbonate (PC), polyaniline (PANI), polyvinyl chloride (PVC), poly(vinylidene fluoride) (PVDF), polyethylene terephthalate (PET), polypropylene (PP), or polyethylene (PE) may be used.

Here, in the step (a), in order to form the conductive carbon nanofiber network, the conductive carbon nanofibers may be produced by carbonizing the electrospun polymer nanofibers through the high-temperature heat treatment in a reducing atmosphere.

Here, in the step (b), when forming a conductive catalyst layer on the nanofiber network as the first coating layer, a method to coat using a solution containing a metal precursor or an ink, or a wet plating method including electroplating and electroless-plating may be used, physical vapor deposition (PVD) including sputtering, pulsed laser deposition, and vacuum evaporation may be used, chemical vapor deposition (CVD) including metal organic chemical vapor deposition, plasma enhanced chemical vapor deposition, and atomic layer deposition may be used, or two or more methods among these may be used together.

Here, in the step (c), when forming the first catalyst layer of a non-conductive normal catalyst layer as the first coating layer, a method to coat using a solution containing a metal precursor or an ink, or a wet plating method including electroplating and electroless-plating may be used, physical vapor deposition (PVD) including sputtering, pulsed laser deposition, and vacuum evaporation may be used, chemical vapor deposition (CVD) including metal organic chemical vapor deposition, plasma enhanced chemical vapor deposition, and atomic layer deposition may be used, or two or more methods among these may be used together.

According to embodiments of the inventive concept, in the nanofiber network-based current collector-catalyst monolithic large-area air electrode, the electrolyte can be fastly and uniformly penetrated due to the high porosity of the air electrode more than 80%, the catalyst is highly stable, and the thickness of the air electrode may be easily increased by stacking the air electrode layer by layer, folding it, or rolling it, and thus an electrode for Li-air batteries having a high energy storage density, and a method of manufacturing are provided and an air electrode for Li-air batteries capable of the mass production at low cost is provided. In particular, a catalyst material may be additionally filled in the empty pores of the three-dimensional fabric-like current collector-catalyst monolithic air electrode, and thus an additional increase in capacity may be expected.

According to embodiments of the inventive concept, in a case of the individual nanofibers constituting the fabric-like nanofiber network are a non-conductive, a porous air electrode including a conductive catalyst layer that is uniformly coated on the surface of the individual nanofibers, namely, a single-layer core (non-conductive nanofiber)/shell (first conductive catalyst layer) structure is provided or a multi-layered porous air electrode including a first coating layer (conductive layer) and a second coating layer (catalyst layer) which are uniformly and continuously coated on the surface of the individual nanofibers, namely, a core (non-conductive nanofiber)/shell (first conductive layer/second catalyst layer) structure is provided. In addition, in a case of the individual nanofibers constituting the fabric-like nanofiber network are conductive carbon nanofibers, a porous air electrode including a conductive catalyst layer or a normal catalyst layer that is uniformly coated on the surface, namely, a single-layer core (conductive carbon nanofiber)/shell (first conductive catalyst layer) or a single-layer core (conductive carbon nanofiber)/shell (first catalyst layer) structure is provided. Here, normal catalyst layer means conventional catalyst materials with non-conducting or semiconducting properties. Thus, the normal catalyst layer doesn't provide current collector function.

Through the layered structure formed by stacking, folding or rolling such a nanofiber network electrode, an effect is exhibited that a nanofiber network electrode for air electrode of a Li-air batteries which has a maximized reaction site per unit area, an excellent electrical conductivity, smooth movement of air and lithium ions, an improved current density per volume, improved stability, and a layered structure and may be mass-produced in a large scale at low cost, and a method of manufacturing the nanofiber network electrode are provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

The inventive concept may have various modifications and various embodiments, and hereinafter, various embodiments of the inventive concept will be described in detail with reference based on the accompanying drawings.

In the following description of the inventive concept, a detailed description on the known prior art will be omitted when it is determined that the detailed description may obscure the gist of the inventive concept.

Although first, second, and the like are used in order to describe various components, the components are not limited by the terms. The above terms are used only to discriminate one component from the other component.

Figure 1A:
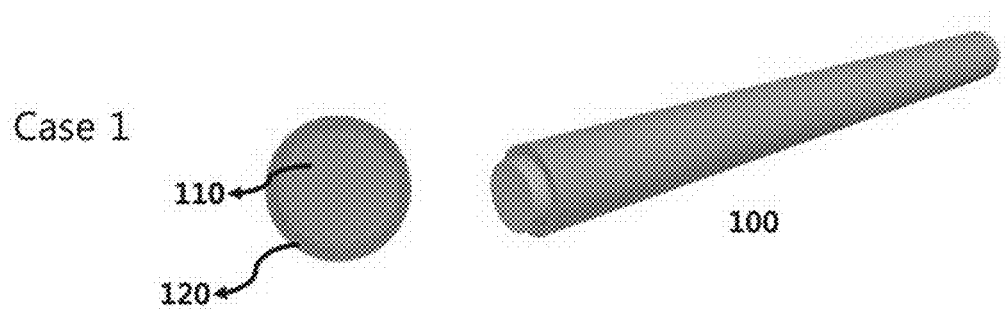
FIG. 1a to 1d are schematic diagrams of the nanofiber network-based current collector-catalyst monolithic large-scale air electrode having a core-shell structure according to the nanofiber, the catalyst layer, the conductive layer of the inventive concept.
Figure 1B:
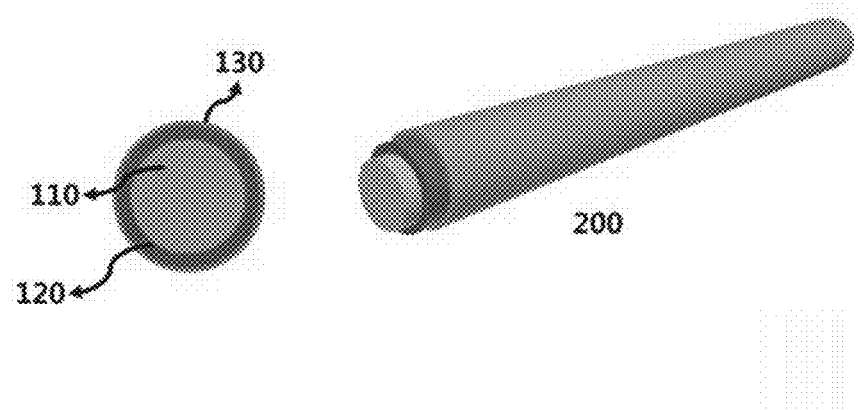
Figure 1C:
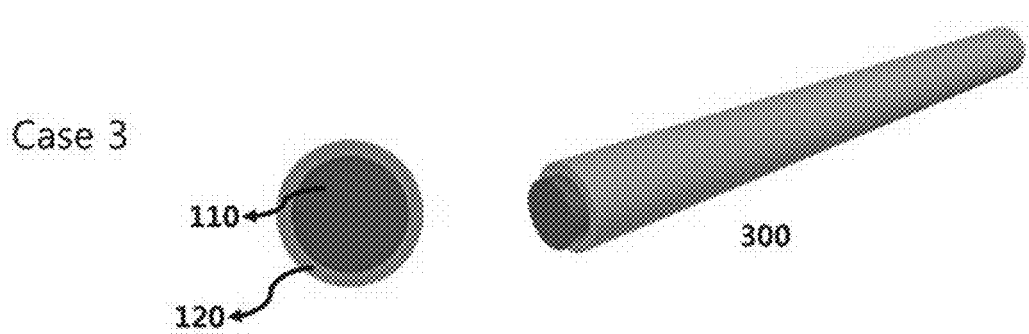
Figure 1D:
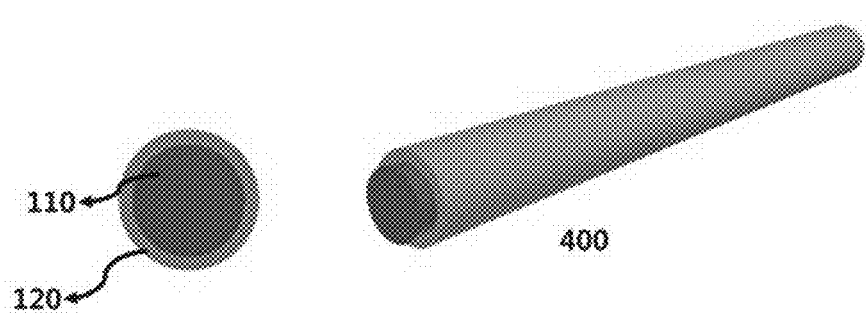

In order to solve the problem related to the low electrochemical reactivity of conventional the air electrode for Li-air batteries which is induced by the heavy current collector such as a metal mesh as well as the low surface area of the metal mesh having a diameter of several to hundreds μm, the inventive concept provides a core-shell nanofiber network-based current collector-catalyst monolithic large-scale air electrode (see 100 of Case 1 in FIG. 1a, 200 of Case 2 in FIG. 1b, 300 of Case 3 in FIG. 1c, and 400 of Case 4 in FIG. 1d). In particular, a nanofiber network-based current collector-catalyst monolithic air electrode which includes a center layer (core) (110) formed by a nanofiber network having a light weight compared to a metal mesh as an existing current collector and a sufficient mechanical strength, and uniformly coated catalyst layer on the surface of the individual nanofibers improving the efficiency of electron transfer and the decomposition of lithium oxide back into lithium and oxygen. A method of manufacturing a nanofiber network electrode for Li-air batteries is provided in which a conductive catalyst layer or a conductive layer and a non-conducting catalyst (single coating layer of first layer (120) or double coating layer formed by sequential coating of the first layer (120) and second layer (130)) are coated on the surface of the nanofiber network, and thus the properties of the reversible electrochemical reaction are improved, thus the cycleability of the battery are improved, and effective penetration of oxygen and lithium ions is possible.

Here, the nanofiber network electrode refers to an electrode having a porous core-shell nanofiber network in which a plurality of nanofibers are randomly scattered to form a void space between the nanofiber bundles, and it is composed of a nanofiber network in which a non-conductive material forms the center layer (core) (110) and a conductive catalyst forms the first coating layer (120) on the surface of the center layer; the nanofiber network is a nanofiber network in which a non-conductive material forms the center layer (core) (110), a conductive thin film layer forms the first coating layer (120) on the surface of the center layer, and a normal catalyst forms the second coating layer (130) thereon; the nanofiber network is a nanofiber network in which a conductive material forms the center layer (core) (110) and a conductive catalyst forms the first coating layer (120) on the surface of the center layer; the nanofiber network is a nanofiber network in which a conductive material forms the center layer (core) (110) and a normal catalyst forms the first coating layer (120) on the surface of the center layer; the nanofiber network is a nanofiber network in which the first coating layer or the second coating layer is formed in a single layer or a double layer; and a layered structure formed by stacking, folding, or rolling the nanofiber network.

FIGS. 1a to 1d illustrate schematic diagrams of the nanofiber network based current collector-catalyst monolithic large-area air electrodes (100 of Case 1 in FIG. 1a, 200 of Case 2 in FIG. 1b, 300 of Case 3 in FIG. 1c, and 400 of Case 4 in FIG. 1d) having the following four cases of core-shell structures of the inventive concept. Case 1: a nanofiber network having a single-layered core-shell structure in which a conductive catalyst layer is the first coating layer (shell) (120) when the non-conductive nanofiber is used as the center layer (core) (110); Case 2: a nanofiber network having a multilayered core-shell structure in which a conductive layer is the first coating layer (shell) (120) and a catalyst layer (non-conductive catalyst layer or nanoparticle catalyst layer) is the second coating layer (130) when the non-conductive nanofiber is used as the center layer (core) (110); Case 3: a nanofiber network having a single-layered core-shell structure in which a conductive catalyst layer is the first coating layer (120) when the conductive nanofiber is used as the center layer (core) (110); and Case 4: a nanofiber network having a single-layered core-shell structure in which a normal catalyst layer is the first coating layer (120) when the conductive nanofiber is used as the center layer (core) (110). As can be seen from the enlarged left diagram in FIGS. 1a to 1d, in the core-shell nanofiber network in which a plurality of (conductive or non-conductive) catalysts or conductive materials are coated on the outside of the individual nanofibers, the center layer (core) (110) of a conductive or non-conductive nanofiber serves as the internal support or the current collector to form the porous nanofiber network. At this time, in a case of the center layer (110) is a conductive nanofiber, it may serve as the internal support and the current collector at the same time, and in a case of the center layer (110) is a non-conductive nanofiber, it may serves as the internal support and the current collector simultaneously with the conductive first coating layer (120).

Here, as the nanofiber network material, a material which can maintain the physical or chemical stability when driving the battery and has a light weight and flexibility as an air electrode may be used without limitations.

Here, in the nanofiber network, a non-conductive material composed of a polymer or a conductive carbon nanofiber material composed of a carbon-based material may be selectively used without limitations.

Here, the non-conductive nanofiber may be composed of one kind or two or more kinds of polymers of polyurethane, a polyurethane copolymer, cellulose acetate, cellulose, acetate butyrate, a cellulose derivative, polymethyl methacrylate (PMMA), polymethyl acrylate (PMA), a polyacrylic copolymer, a polyvinyl acetate copolymer, polyvinyl acetate (PVAc), polyvinylpyrrolidone (PVP), polyvinyl alcohol (PVA), polyfurfuryl alcohol (PPFA), polystyrene (PS), a polystyrene copolymer, polyethylene oxide (PEO), polypropylene oxide (PPO), a polyethylene oxide copolymer, a polypropylene oxide copolymer, polycarbonate (PC), polyvinyl chloride (PVC), polycaprolactone, polyvinyl fluoride, a polyvinylidene fluoride copolymer, polyimide, polyacrylonitrile (PAN), polyvinyl alcohol (PVA), polycarbonate (PC), polyaniline (PANI), polyvinyl chloride (PVC), poly (vinylidene fluoride) (PVDF), polyethylene terephthalate (PET), polypropylene (PP), or polyethylene (PE).

Here, the subsequent heat treatment or a high-temperature deposition process (200° C. or higher) is often required to deposit the conductive layer or the catalyst layer on the non-conductive polymer nanofiber web, and thus a polyimide nanofiber may be preferably used among various polymer materials due to its high thermal stability up to 300° C.

Here, the conductive nanofiber may include a conductive carbon-based nanofiber that is produced through carbonization of the polymer nanofiber.

Here, an electrospinning method may be used in order to form the non-conductive and conductive nanofiber networks, and this technique has the advantage for producing non-conductive and conductive nanofibers. An electrospinning set-up may be constituted by a high voltage generator (dc power supply), a syringe pump, a needle, and a current collector. Upon conducting the electrospinning method, first, the current collector is positioned on a grounded conductive substrate. At this time, the positive (+) bias is applied to the syringe nozzle including the electrospinning solution so as to ejecting them to the grounded conductive substrate. A voltage of 8 to 30 kV is applied thereto, and the highly viscous polymer dissolved electrospinning solution is electrospun by controlling the ejecting speed of the solution in a range of 10 to 300 μL/min. At this time, the multiple syringes may be used, and the as-spun polymer nanofiber network may be subjected to a pre-treatment such as a heat treatment.

Here, the nanofiber network may be composed of nanofibers having a diameter of 50 nm to 3 μm and a length of 100 μm or longer.

Here, the pores included in the nanofiber network may have a diameter in a range of 100 nm to 200 μm.

Here, the nanofiber network air electrode having a core-shell structure may have a thickness in a range of 10 to 500 μm.

Here, in the nanofiber network, the nanofibers may be aligned in an ordered form.

Here, in the nanofiber network, the nanofibers may be aligned in an ordered form while crossing each other in a horizontal and a longitudinal direction.

Here, in a case of the conductive nanofiber is used as the center layer, the first coating layer may be a normal catalyst layer, and in a case of the non-conductive nanofiber is used as the center layer, the first coating layers should be a conductive layer (conductive thin film layer) and the second coating layer may be a common catalyst layer.

Here, as the conductive layer, a material which solves the mechanical and electrical contact problem that may be caused between the nanofiber and the catalyst layer and provides a sufficient electrical conductivity as a current collector may be used without limitations.

Here, the conductive layer may have a thickness of 20 to 500 nm.

Here, the conductive layer may be composed of one or two or more metals of nickel (Ni), tin (Sn), indium (In), lead (Pb), zinc (Zn), cadmium (Cd), gold (Au), silver (Ag), platinum (Pt), palladium (Pd), copper (Cu), iron (Fe), aluminum (Al), or stainless steel, or a single material or two or more layered materials having a sufficient electrical conductivity such as Indium oxide ($In_2O_3$), tin-doped indium oxide (ITO; $Sn:In_2O_3$), zinc oxide (ZnO), aluminum-doped zinc oxide (AZO; Al:ZnO), tin oxide ($SnO_2$), or fluorine-doped tin oxide (FTO; $F:SnO_2$) may be used without limitations.

Here, as the method for coating the conductive layer, a metal deposition method capable of conducting continuous R2R (roll-to-roll) deposition in a large scale, a method to coat using a solution containing a metal precursor or an ink, or a wet plating method including electroplating and electroless-plating may be used, physical vapor deposition (PVD) including sputtering, pulsed laser deposition, and vacuum evaporation may be used, chemical vapor deposition (CVD) including metal organic chemical vapor deposition, plasma enhanced chemical vapor deposition, and atomic layer deposition may be used, or two or more methods among these may be used together.

Here, the conductive catalyst layer may be a material which possesses high electrical conductivity and catalytic properties at the same time and may be a metal including platinum (Pt), gold (Au), silver (Ag), palladium (Pd), ruthenium (Ru), or iridium (Ir), an oxide including ruthenium oxide ($RuO_2$), iridium oxide ($IrO_2$), strontium-ruthenium oxide ($SrRuO_3$), or lanthanum-nickel oxide ($LaNiO_3$), or a carbide including titanium carbide (TiC), or a nitride including titanium nitride (TiN) or tantalum nitride ($Ta_2N_5$), and it is not limited to a particular material as long as a material has an electrical conductivity enough to be used as a current collector and excellent catalytic activity at the same time.

Here, the conductive catalyst layer may be formed in the form of nanoparticles, a nanosheet, or a nanofilm.

Here, as the normal catalyst layer, a material which has a function to lower the overvoltage caused when the oxygen reduction reaction (ORR) and the oxygen evolution reaction (OER) take place in the air electrode during discharge may be used without limitations.

Here, the normal catalyst layer may be used as the first coating layer or may be used as the second coating layer formed on the conductive layer that is formed on the non-conductive nanofiber as the first coating layer.

Here, the normal catalyst layer may be formed in the form of nanoparticles, a nanosheet, or a nanofilm.

Here, the normal catalyst layer may be coated in a thickness range of 5 to 20 nm.

Here, the material of the normal catalyst layer may include a two-component system metal oxide including cobalt oxide ($Co_3O_4$), manganese oxide ($MnO_2$), and nickel oxide (NiO) and a three-component metal oxides including lanthanum-manganese oxide ($LaMnO_3$), lanthanum cobalt oxide ($LaCoO_3$), and lanthanum-iron oxide ($LaFeO_3$).

Here, as the method for coating the normal catalyst layer, a metal deposition method capable of conducting continuous R2R (roll-to-roll) deposition in a large scale, a method to coat using a solution containing a metal precursor or an ink, or a wet plating method including electroplating and electroless-plating may be used, physical vapor deposition (PVD) including sputtering, pulsed laser deposition, and vacuum evaporation may be used, chemical vapor deposition (CVD) including metal organic chemical vapor deposition, plasma enhanced chemical vapor deposition, and atomic layer deposition may be used, or two or more methods among these may be used together.

Here, the nanofiber network air electrode may have a layered structure formed by stacking, folding, or rolling a plurality of the nanofiber network.

Here, the volume of the layered structure may be in a range of 1 $cm^3$ to 1 $m^3$.

A battery using the nanofiber network electrode according to an aspect of the inventive concept is equipped with the nanofiber network air electrode according to the inventive concept, and the nanofiber network air electrode can be also used as a current collector for a battery including lithium-ion batteries, fuel cells, photochemical cells, and solar cells in addition to Li-air batteries.

Hereinafter, the inventive concept will be described in detail with reference to more specific Examples. However, these are examples for explaining the inventive concept in more detail, but the inventive concept is not limited thereto.

Figure 2:
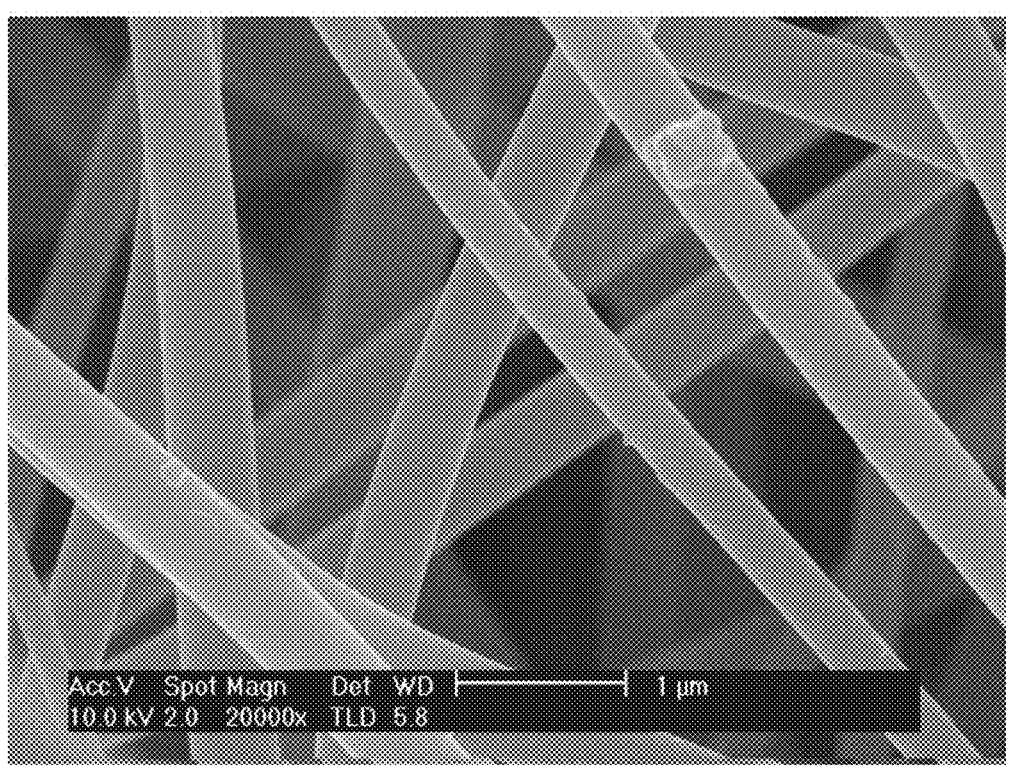
FIG. 2 is a scanning electron microscope (SEM) image of the PAA (poly(amic acid)) nanofibers synthesized by the electrospinning method in Example 1 of the inventive concept.

Example 1: Manufacture of Current Collector-Catalyst Monolithic Electrode Having Single-Layered Core (Non-Conductive Polyimide Nanofiber Network)/Shell (Conductive TiN) Structure A uniform electrospinning solution was prepared by dissolving 1.0 g of pyromellitic dianhydride (PMDA, Alfa-Aesar) and 0.9 g of 4,4'-oxydianiline (ODA, Sigma-Aldrich) into the 8 g of a N,N-dimethylformamide (DMF, Sigma-Aldrich) solution, and stirring them with a speed of 500 RPM for 4 hours at room temperature. The homogeneously mixed solution formed a PAA (Poly (amic acid)) solution, the PAA solution was introduced into a 12 ml syringe on the electrospinning machine, then the solution was pushed out of the syringe at a constant flow rate (injecting rate), and a high voltage is applied between the 21 gauge (GA) needle and the current collector, whereby the PAA solution was ejected out as a jet shape due to the repulsive force between charged molecules and collected on the current collector as a form of a spinneret. Here, the applied voltage was 15 kV, the injecting rate of the solution was 10 μL/min, and the needle-to-collector distance was 15 cm. The collected PAA nanofibers were observed by a scanning electron microscope (SEM), and the results are illustrated in FIG. 2. As observed in FIG. 2, the PAA nanofiber network structure is homogeneously formed. The PAA nanofibers were thermally heated up for 1 hour at 100° C., for 1 hour at 200° C., and for 1 hour at 300° C. step by step in the air atmosphere using a small electric furnace Vulcan 3-550 manufactured by NeyTech, whereby the polyimide nanofibers were successfully synthesized. At this time, the heating rate and the cooling rate were constantly maintained at 5° C./min.

Figure 3:
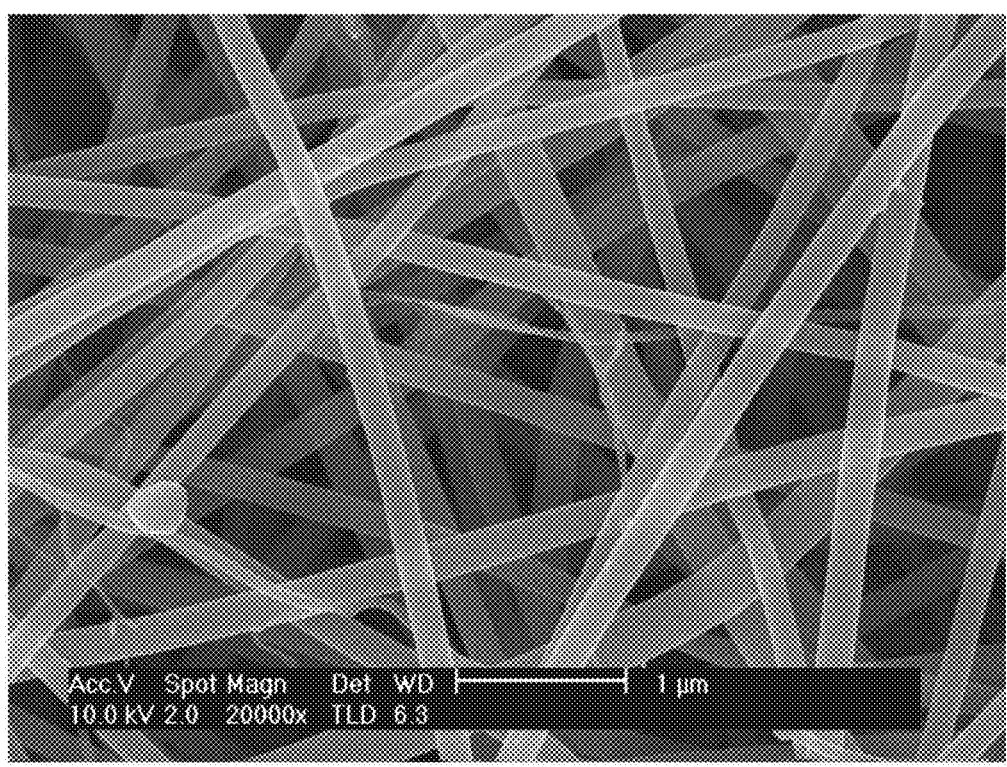
FIG. 3 is a scanning electron microscope (SEM) image of the polyimide nanofibers synthesized by the electrospinning method in Example 1 of the inventive concept.

FIG. 3 illustrates the polyimide nanofibers according to Example 1 of the inventive concept. The polyimide nanofibers had a smooth surface, a diameter in a range of 200 to 400 nm, and a three-dimensional nanofiber network structure having pores with a size of several nm to several μm. Here, the polyimide nanofibers were a non-conductive material that is not electrically conductive and used as the center layer (110) of the internal support having a strong mechanical strength and high thermal stability.

In order to coat the uniform TiN catalyst layer which had a function to lower the overpotential for oxygen reduction reaction (ORR) and the oxygen evolution reaction (OER) took place in the air electrode, the atomic layer deposition (ALD) method was used, and TDMAT (tetrakis-dimethyl-amino-titanium, 99.999% purity) was used as the deposition source. The deposition temperature was constantly maintained at 200° C., one cycle includes deposition with the TDMAT source for 2 seconds, purging with argon (Ar) for 8 seconds, treatment with nitrogen ($N_2$) plasma for 20 seconds (power 250 W), and purging with argon for 8 seconds, and it has been confirmed that TiN is uniformly deposited on the polyimide surface through the deposition of 150 cycles observed by a scanning electron micrograph (SEM) illustrated in FIG. 4 and a transmission electron micrograph (TEM) illustrated in FIG. 5. TiN can be used as a conductive catalyst layer which exhibits catalytic properties and excellent electrical conductivity properties at the same time.

Figure 4:
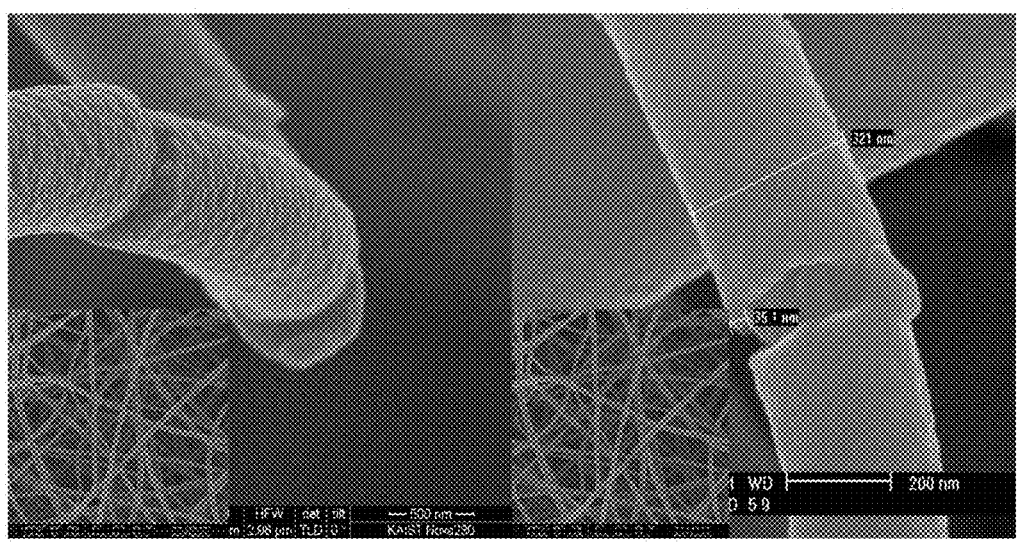
FIG. 4 is a scanning electron microscope (SEM) image of the inside of the polyimide nanofibers coated with a conductive catalyst layer (TiN) deposited through the atomic layer deposition process in Example 1 of the inventive concept.

FIG. 4 is a SEM image of the TiN coated polyimide nanofibers, according to Example 1 of the inventive concept, the TiN catalyst layer through the atomic layer deposition method is referred as the first coating layer (120). It has been confirmed that the TiN coating layer is partially broken during the coating process as seen from the left diagram in FIG. 4, the TiN coating layer is coated in a thickness of about 35 nm as seen from the right diagram, and the TiN coating layer is uniformly coated as seen from the inset. It has been confirmed that the atomic layer deposition (ALD) is a coating process which can uniformly coat a catalyst layer on each surface of the individual nanofibers.

Figure 5:
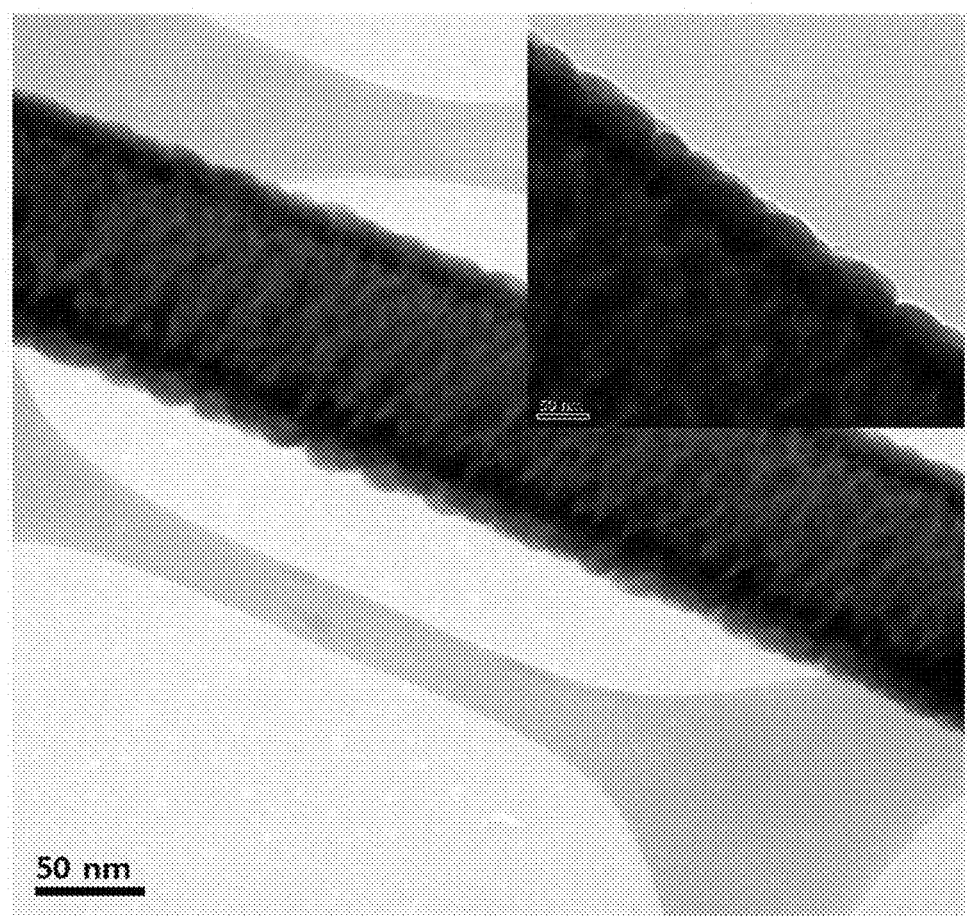
FIG. 5 is a transmission electron microscope (TEM) image of the surface of the polyimide nanofibers coated with a conductive catalyst layer (TiN) deposited through the atomic layer deposition process in Example 1 of the inventive concept.

FIG. 5 is a TEM image illustrating the inside shape of the polyimide nanofibers coated with the TiN catalyst layer as the first coating layer (120) through the atomic layer deposition method according to Example 1 of the inventive concept. It has been confirmed that the polyimide nanofiber is favorably formed as the core and the TiN coating layer is coated in a uniform thickness as the shell as seen from the inset.

Figure 6:
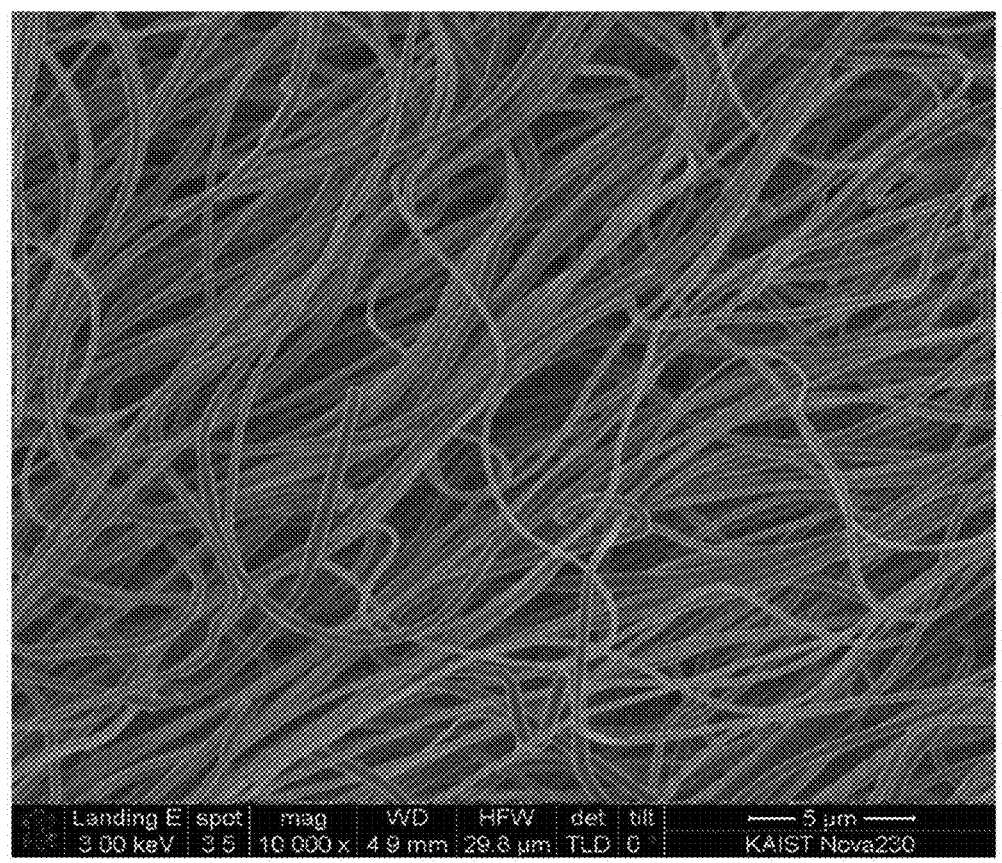
FIG. 6 is a scanning electron microscope (SEM) image of the PAN (polyacrylonitrile) nanofibers synthesized by the electrospinning method in Example 2 of the inventive concept.

Example 2: Manufacture of Current Collector-Catalyst Monolithic Electrode Having Single-Layered Core (Conductive Carbon Nanofiber Network)/Shell (Conductive TiN) Structure In order to use conductive carbon nanofiber network as a current collector and an internal support of the air electrode at the same time, highly conductive carbon nanofibers were synthesized through the electrospinning method and subsequent carbonization step at the high temperature. 1.0 g of PAN (polyacrylonitrile, Sigma-Alrich), which is used as the carbon source, was added to 6 g of a DMF (N,N-dimethylformamide, Sigma-Aldrich) solution, which was stirred for 12 hours at 50° C. and 500 RPM to prepare a uniform PAN solution. The PAN solution was introduced into a 12 ml syringe on the electrospinning set-up, the solution was pushed out of the syringe at a constant flow rate (injecting rate), and a high voltage was applied between the 21 gauge (GA) needle and the current collector, whereby the PAA solution was ejected out as a jet shape due to the repulsive force between charged molecules, and the PAA nanofibers were collected on the current collector in the form of a spinneret. Here, the applied voltage was 18 kV, the injecting rate of the solution was set to 15 μL/min, and the needle-to-collector distance was 15 cm. The collected PAN nanofibers were observed through a SEM, the results are illustrated in FIG. 6, and it has been confirmed that the PAN nanofibers are synthesized without defects or beads. In order to form a strong bond between the carbon atoms, the PAN nanofibers were stabilized for 1 hour at 250° C. in the air atmosphere using a small electric furnace Vulcan 3-550 manufactured by NeyTech. At this time, the heating rate and the cooling rate were constantly maintained at 5° C./min. In order to induce carbonization of the stabilized PAN nanofibers, minimizing the defect and providing high electrical conductivity, the stabilized PAN nanofibers were subsequently calcined at 1000° C. for 2 hours in an argon (Ar) atmosphere, at this time, the heating rate was constantly maintained at 10° C./min.

Figure 7:
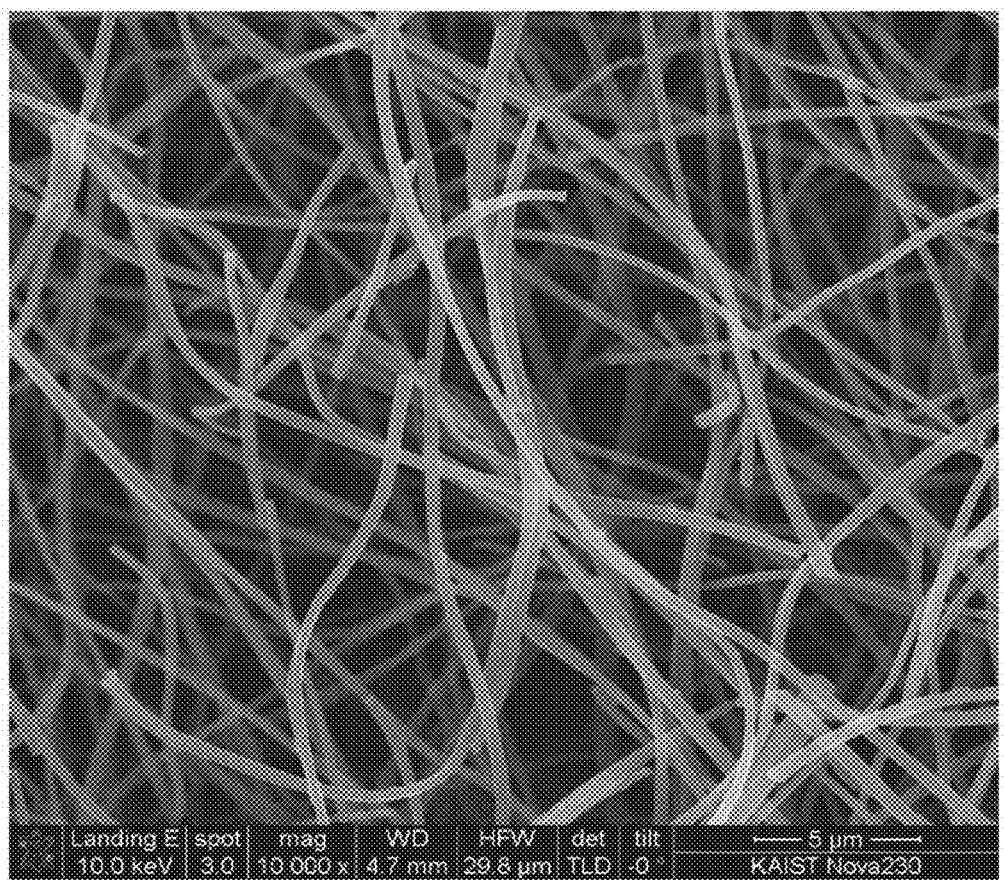
FIG. 7 is a scanning electron microscope (SEM) image of the conductive carbon nanofibers obtained through carbonization of the PAN nanofibers in Example 2 of the inventive concept.

FIG. 7 shows a SEM image of the carbon nanofibers according to Example 2 of the inventive concept. The carbon nanofibers had a smooth surface, a diameter in a range of 200 to 500 nm, and a three-dimensional nanofiber network structure exhibiting pores with a size of several nm to several μm. Here, the carbon nanofibers have high electrical conductivity and high mechanical stability unlike the polyimide nanofibers that are electrically non-conductive of Example 1, and the carbon nanofibers were used as the center layer (110) which was able to serve as the internal support and the current collector at the same time.

In order to coat the uniform TiN catalyst layer which had a function to lower the overpotential for the oxygen reduction reaction (ORR) and the oxygen evolution reaction (OER) in the air electrode, the atomic layer deposition method was used among the coating methods. The deposition temperature was constantly maintained at 150° C., and TiN was deposited for 150 cycles under the same deposition condition as in Example 1. It has been confirmed that a current collector-catalyst monolithic electrode having a single-layered core (carbon nanofiber network)/shell (TiN) structure in which TiN is uniformly deposited on the surface of the carbon nanofiber observed by a SEM illustrated in FIG. 8 and a TEM illustrated in FIG. 9.

Figure 8:
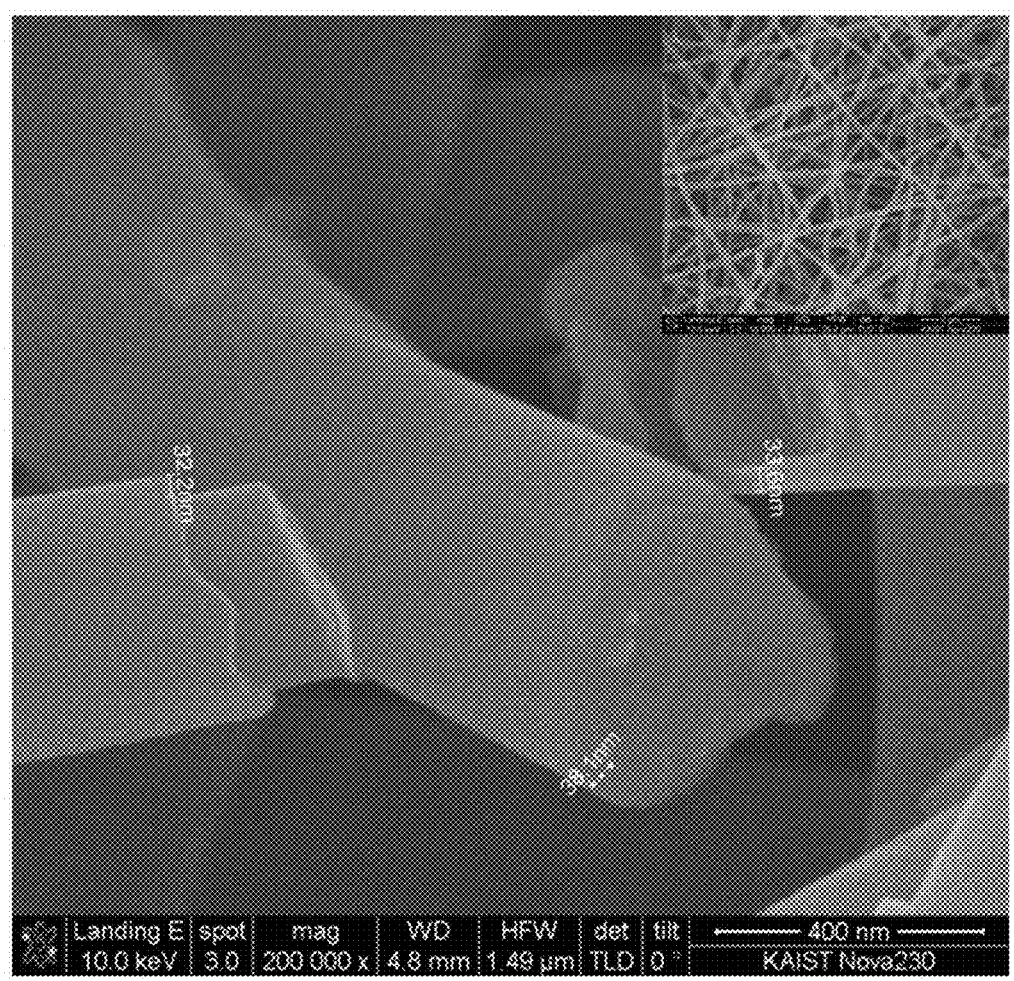
FIG. 8 is a scanning electron microscope (SEM) image of the surface of the carbon nanofibers coated with a conductive catalyst layer (TiN) deposited through the atomic layer deposition process in Example 2 of the inventive concept.

FIG. 8 shows a SEM image of a nanofiber network having a single-layer core (carbon nanofiber network)/shell (TiN) structure in which the TiN catalyst layer was deposited on the surface of the carbon nanofiber as the first coating layer through the atomic layer deposition method according to Example 2 of the inventive concept. As seen from the FIG. 8, the TiN coating layer is partially detached and the TiN coating layer is coated in a thickness of 32 to 35 nm. In addition, the TiN coating layer is uniformly coated on the surface of the carbon nanofiber as seen from the inset.

Figure 9:
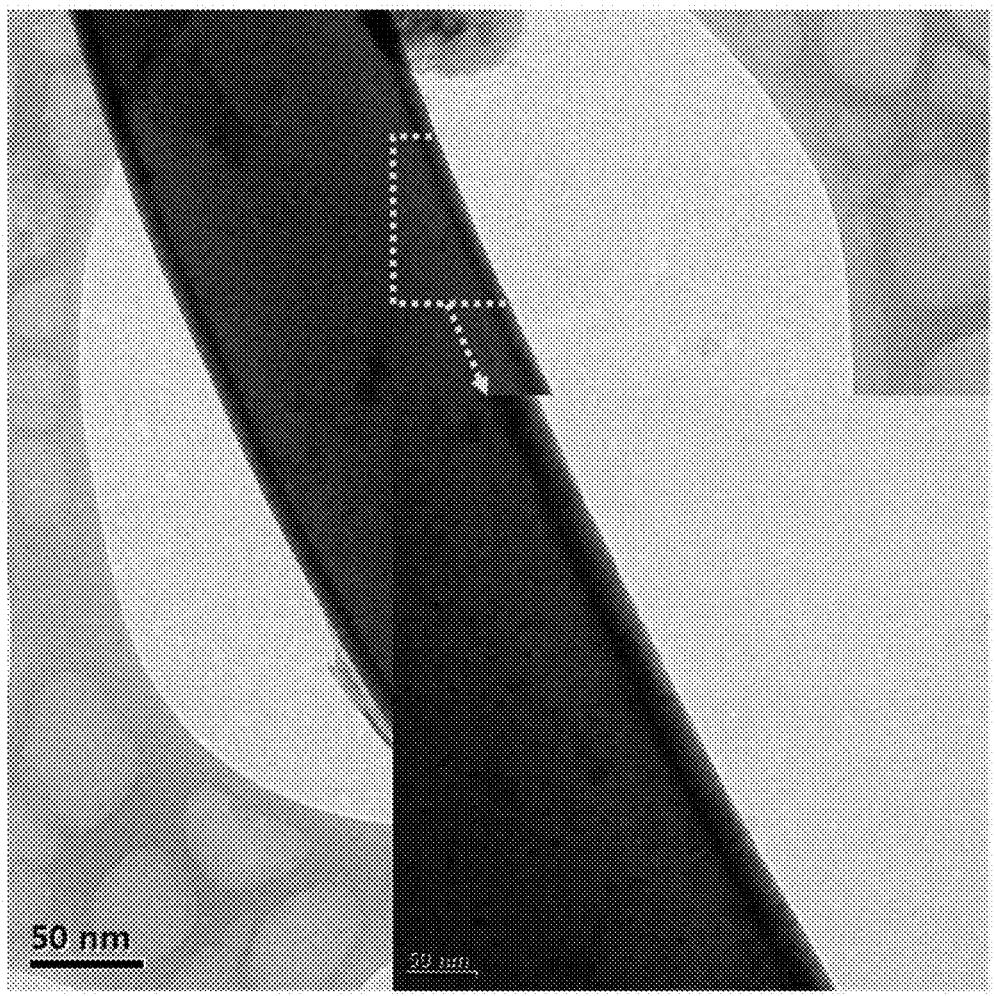
FIG. 9 is a transmission electron microscope (TEM) image of the surface of the carbon nanofibers coated with a conductive catalyst layer (TiN) deposited through the atomic layer deposition process in Example 2 of the inventive concept.

FIG. 9 shows a TEM image exhibiting the inside shape of the a nanofiber network having a single-layered core (carbon nanofiber network)/shell (TiN) structure in which the TiN catalyst layer was deposited on the surface of the carbon nanofiber through the atomic layer deposition method according to Example 2 of the inventive concept. It has been confirmed that the carbon nanofiber is homogeneously formed as the core and the TiN coating layer is coated in a uniform thickness as the shell as seen from the inset.

The core center layer (110) of the nanofiber networks of Examples 1 and 2 are required to have high thermal stability because catalyst deposition may be performed at a high-temperature (200° C. or higher) in order to uniformly deposit the catalyst layer (120), and it is preferable that the catalyst layer (120) exhibits high stability with respect to the electrolyte and assists efficient formation and decomposition of lithium oxide. It is preferable that the catalyst layer and the conductive layer respectively have a thickness of 30 nm from a practical point of view in consideration of the mechanical strength and electrical conductivity because the thickness may be depended on the number of cycles during atomic layer deposition.

Example 3: Manufacture of Current Collector-Catalyst Monolithic Electrode Having Single-Layered Core (Conductive Carbon Nanofiber Network)/Shell (Non-Conductive $Co_3O_4$) Structure The carbon nanofibers were produced by the same process as in Example 2, and they have high electrical conductivity and high mechanical stability, and they are used as the core center layer (110) which was able to serve as the internal support and the current collector at the same time.

In order to uniformly coat the cobalt oxide ($CO_3O_4$) catalyst layer which had a function to lower the overpotential for the oxygen reduction reaction (ORR) and the oxygen evolution reaction (OER), the LBL (Layer by Layer) deposition method was used among the coating methods. The cobalt oxide is known as a P-type semiconductor material. The LBL deposition method is a process to stack ions having a negative charge and a positive charge by the Coulomb force repeatedly, and it has an advantage that a highly uniform and high quality thin film can be formed in a short time and at a lower temperature compared to the atomic layer deposition process.

First, the carbon nanofiber network was immersed in a nitric acid ($HNO_3$) solution and stirred for 8 hours at 50° C. to form a functional group (COOH, OH) on the surface. The functionalized surface of the carbon nanofiber had a negative charge of $COO^-$ and $O^-$ in the aqueous solution, and the functionalized carbon nanofibers were immersed in 25 ml of an aqueous solution (pH was maintained at 12) containing 0.5 g of cobalt nitrate hydrate ($Co(NO_3).6H_2O$) having a positive charge ($[Co(NH_3)_6]^+$). In this case, the positively charged cobalt ions are attracted to the negatively charged surface of the carbon nanofiber by the Coulomb force. The carbon nanofibers were immersed in the aqueous solution containing the cobalt ion for 1 minute so that sufficient positive charges were dispersed and attached thereto and then in deionized water for 15 seconds to wash it. Next, in order to solidify the positive charges on the outermost surface, the resultant carbon nanofibers were immersed in 25 ml of an aqueous solution containing 1 ml of hydrogen peroxide ($H_2O_2$) for 1 minute to form a CoO(OH) phase. The above process was repeated eight times and the resultant was sufficiently dried in the air, whereby the existing CoO(OH) phase reacted with $O_2$ to be converted into an amorphous phase of cobalt oxide ($Co_3O_4$). The main process parameters in the LBL deposition method are the concentration of the Co precursor solution, the dipping time and number of the carbon nanofibers, and the like, and these can be controlled.

Figure 10:
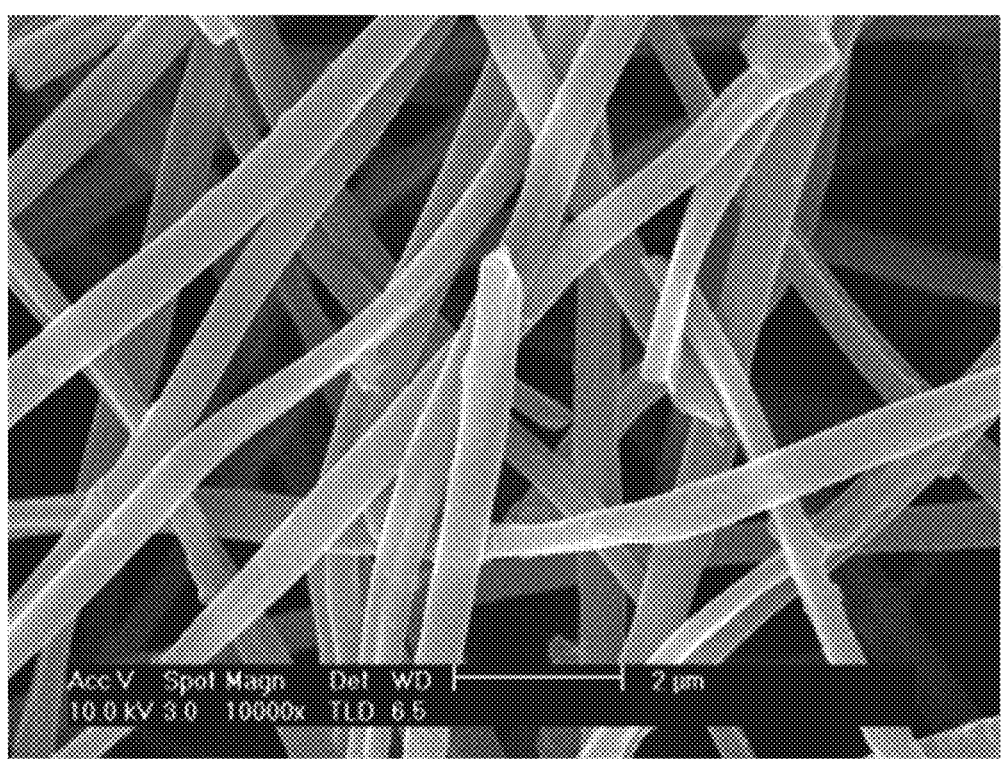
FIG. 10 is a scanning electron microscope (SEM) image of the surface of the carbon nanofiber network coated with a catalyst layer ($Co_3O_4$) deposited in the form of a thin film by a LBL (Layer by Layer) deposition method in Example 3 of the inventive concept.

FIG. 10 is a SEM image of a nanofiber network having a single-layered core (carbon nanofiber network)/shell ($Co_3O_4$) structure in which the catalyst layer of cobalt oxide is coated on the surface of the carbon nanofiber as the first coating layer (120) through the LBL (layer by layer) deposition process (dipping time: 1 minutes/dipping number: 8 times) according to Example 3 of inventive concept. It can be seen that a cobalt oxide thin film layer is uniformly formed on the surface of the carbon nanofiber.

Figure 11:
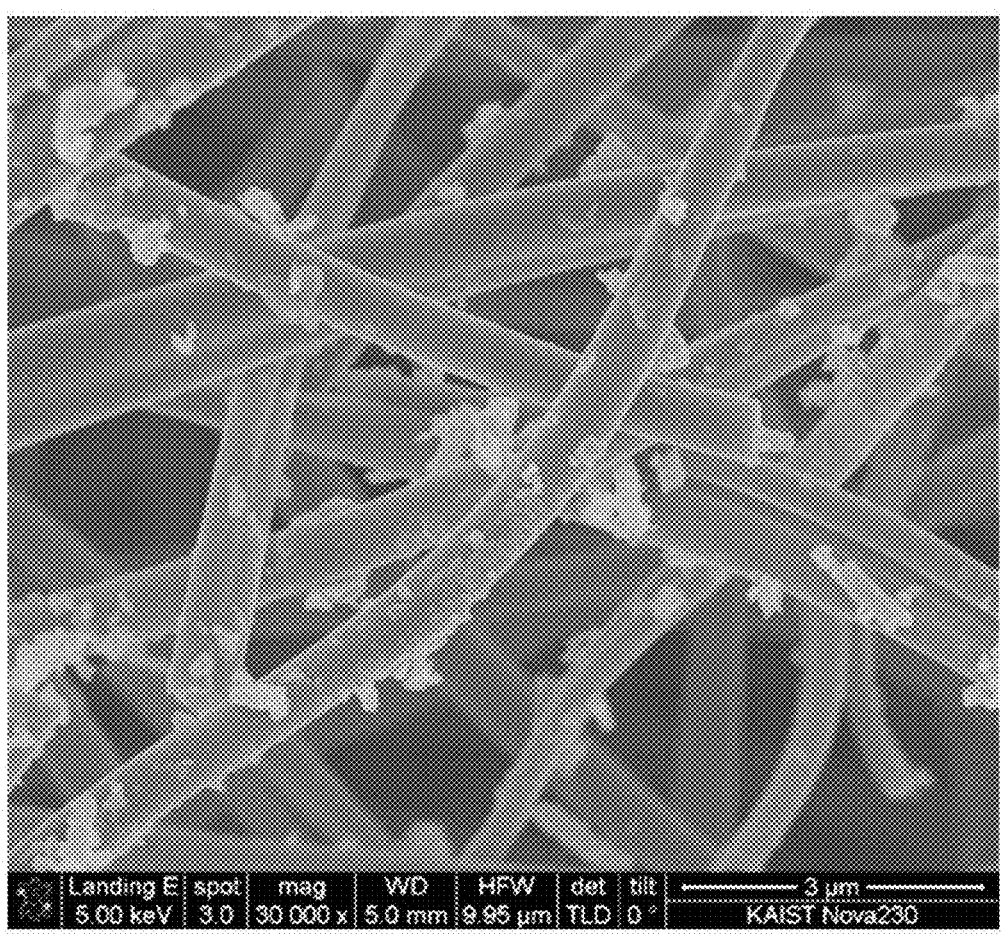
FIG. 11 is a scanning electron microscope (SEM) image of the surface of the carbon nanofiber network coated with a catalyst layer ($Co_3O_4$) deposited in the mixed form of a thin film and nanoparticles by a LBL (Layer by Layer) deposition method in Example 3 of the inventive concept.

FIG. 11 is a SEM image of a nanofiber network having a single-layered core (carbon nanofiber network)/shell ($Co_3O_4$) structure in which the catalyst layer of cobalt oxide is coated on the surface of the carbon nanofiber as the first coating layer (120) through the LBL deposition process (dipping time: 5 minutes/dipping number: 8 times) according to Example 3 of inventive concept. Unlike the results of FIG. 10, it can be seen that aggregated cobalt oxide nanoparticles which are derived from excessive cobalt precursors are attached onto the uniform cobalt oxide thin film layer due to the long dipping time of 5 minutes.

The core center layer (110) of the nanofiber network of Example 3 is not required to be subjected to the subsequent heat treatment or a high temperature deposition process in order to uniformly deposit the catalyst layer (120), and thus it is possible to use all of the nanofibers which exhibit high electrical conductivity and high mechanical stability as the core center layer (110) in this process, and it is desirable that the catalyst layer (120) exhibits high stability with respect to the electrolyte and shows efficient catalytic effects for formation and decomposition of lithium oxide at the same time. It is desirable that the catalyst layer has a thickness of 1 to 20 nm from a practical point of view in consideration of electrical conductivity and the mechanical strength because the thickness of the catalyst layer can be controlled by changing the processing parameters such as the concentration of the precursor solution, the dipping time and the number.

Example 4: Manufacture of Current Collector-Catalyst Monolithic Electrode Having Multilayer Core (Non-Conductive Polyimide Nanofiber Network)/Shell (First Coating Layer-Al/Second Pd Nanoparticle Catalyst) Structure The polyimide nanofibers were produced by the same process as in Example 1. Here, the polyimide nanofibers were a non-conductive material that is electrically insulating and used as the center layer (110) of the internal support having a strong mechanical strength and high thermal stability.

In order to continuously form the conductive layer (Al) and the nanoparticle catalyst layer (Pd) on the surface of the polyimide nanofibers, an aluminum precursor ink and a solution containing a Pd precursor was utilized. The aluminum precursor ink is easily absorbed onto the surface of polyimide nanofiber and can be easily converted into an aluminum layer on the surface of the polyimide nanofiber even at a low temperature. Then, Pd nanoparticles dissolved solution was mixed with Al-coated polyimide nanofibers and dried. Uniform coating of the Pd nanoparticles on the surface of the Al coated polyimide nanofiber was achieved at room temperature in a short time.

The production method of an aluminum ink is as follows. $AlCl_3$ of 20 mmol and LAH of 60 mmol are mixed with 50 mL of dibutyl ether ($O(C_4H_9)_2$), and the mixture was subjected to a chemical reaction at 75° C. for 1 hour. The reaction product was washed several times in order to remove LiCl that is a side product, thereby obtaining a solution of an aluminum ink of $AlH_3\{O(C_4H_9)_2\}$.

For the Al coating pre-treatment, the polyimide nanofiber network thus obtained was placed on a hot plate at 100° C. and subjected to the catalyst treatment on bare polyimide nanofibers for 10 minutes by evaporating the titanium isopropoxide ($Ti(O-i-Pr)_4$) catalyst immediately next thereto. In order to suppress a side reaction at this time, the whole process was conducted in a glove box filled with argon (Ar). The polyimide nanofiber network treated with the evaporated titanium isopropoxide ($Ti(O-i-Pr)_4$) catalyst was immersed in the aluminum ink solution to decompose $AlH_3\{O(C_4H_9)_2\}$ into Al, $H_2$, and $O(C_4H_9)_2$) at room temperature. At this time, the nucleation and crystal growth of Al were obtained as a decomposition product proceeds. The growth of Al can be controlled by the coating time. The thickness of the Al conductive layer on the surface of the polyimide nanofiber is preferable to be around 100 nm or thicker from the viewpoint of electrical conductivity in consideration of the $Al_2O_3$ layer of about 1 to 10 nm formed on the outermost surface as native oxide.

The coating of the Pd metal catalyst layer is as follows. 0.305 g of palladium(II) acetylacetonate was mixed and reacted with 20 mL of oleylamine and 0.096 g of borane t-butylamine. The reaction was allowed to proceed at 300° C. for 1 hour, and then Pd nanoparticle metal catalysts were formed at this time. After formation of the catalyst, ethanol was mixed with the catalyst solution and the mixture was subjected to centrifugation and to be washed several times in order to remove and wash the aggregated particles. In order to obtain evenly coated Pd nanoparticles on the polyimide nanofiber network coated with the conductive layer (Al), the polyimide nanofiber network coated with the conductive layer (Al) was dipped in the Pd nanoparticles-dissolved solution. After drying, Pd nanoparticles loaded polyimide nanofiber network coated with a conductive layer (Al) and was obtained.

Figure 12:
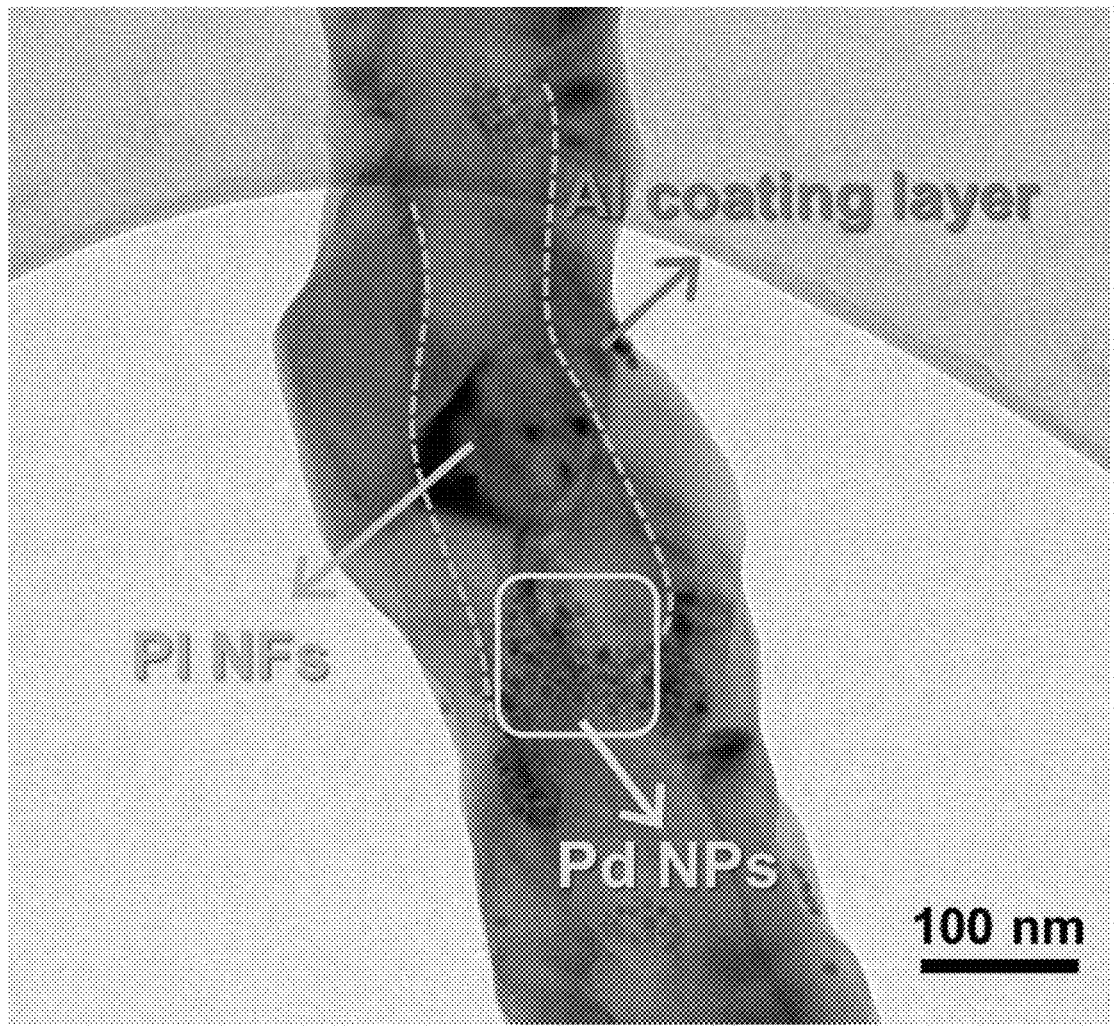
FIG. 12 is a transmission electron microscope (TEM) image of the polyimide nanofiber network coated with thin aluminum metal layer through the reduction of an aluminum hydride solution and subsequently coated with a metal nanoparticle catalyst (Pd) thereon in Example 4 of the inventive concept.

FIG. 12 is a TEM image of the nanofiber network having multilayered core (polyimide nanofiber network)/shell (first coating layer-Al/second coating layer-Pd nanoparticle catalyst) structure in which the conductive layer (Al) and the catalyst (Pd) nanoparticles are coated on the surface of the polyimide nanofiber as the first coating layer (120) and the second catalyst layer (130) through a coating method using an aluminum ink solution (catalyst treatment: 10 minutes/Al coating: 2 hours) and subsequent decoration of Pd nanoparticles respectively, according to Example 4 of the inventive concept. As observed in the TEM image, it has been confirmed that the electrically conductive Al thin film layer is uniformly coated on the surface of the non-conductive polyimide nanofiber. It is significantly important to coat a conformal conductive thin film so as to serve as a current collector, and it is required to use a wet process or the atomic layer deposition method in order to uniformly cover the 3-dimensional nanofiber network layers. In addition, from FIG. 12, it can be seen that the Pd nanoparticles are coated on top of the Al thin film layer without aggregation. In the present Example 4, Pd particles were used, but the types of the particles are not limited to the specific particles as long as a nanoparticle catalyst can improve the reaction performance of OER and ORR.

Analysis Example 1

Manufacture of air electrode of Li-air batteries using current collector-catalyst monolithic electrode having single-layered core (non-conductive polyimide nanofiber network)/shell (conductive TiN) structure (Example 1) and current collector-catalyst monolithic electrode having single-layered core (conductive carbon nanofiber network)/shell (conductive TiN) structure (Example 2) and evaluation on electrochemical properties thereof The performance of the respective electrodes was evaluated by the charge and discharge voltage curves of the Li-air batteries in order to investigate the catalytic activity and the electrolyte stability of the samples prepared in Examples 1 and 2. For this purpose, the samples obtained in Examples 1 and 2 were punched using a punching machine (ϕ 11.8), and the punched samples themselves were used as the operating electrode without using a binder, a conductive material, and a metal current collector to evaluate the electrochemical properties.

In the configuration of a cell, a TEGDME (tetra(ethylene glycol)dimethyl ether) solution prepared by dissolving 1M of LiTFSI (lithium bis(trifluoromethanesulfonyl)imide) was used as the electrolyte. The polyimide nanofiber network coated with TiN and carbon nanofiber network coated with TiN according to Examples 1 and 2 were respectively used as the operating electrodes, and as a reference electrode, a metal lithium foil having a purity of 99.99% (Foote Mineral Co.) was used as the negative electrode used as a counter electrode. A glass filter (Whatman) was used as a separator which prevented an electrical short-circuit by limiting the electron transfer between the negative electrode and the positive electrode, and the entire cell fabrication was conducted in a glove box in which an argon (Ar) atmosphere. The charge and discharge test was carried out with the model WBS 3000 manufactured by WonATECH, and a change in voltage was measured at a constant current in MPS (multi-protentiostat system). The current density used during charge and discharge was 500 mA/g, and the cut-off voltage was set to 2.35 to 4.35 V (vs Li/Li$^+$). At this time, all of the capacity values were calculated using the weight of the nanofiber network-based current collector-catalyst monolithic air electrode because the binder, the conductive material, and the other current collector were not used. The current collector-catalyst monolithic nanofiber network obtained by the inventive concept has a great advantage that the process can be simplified because it does not separately need to use a binder and a conductive material (carbon black particles), and the nanofiber network web can be easily manufactured in a large scale by a method to stack, fold, or roll it.

Figure 13:
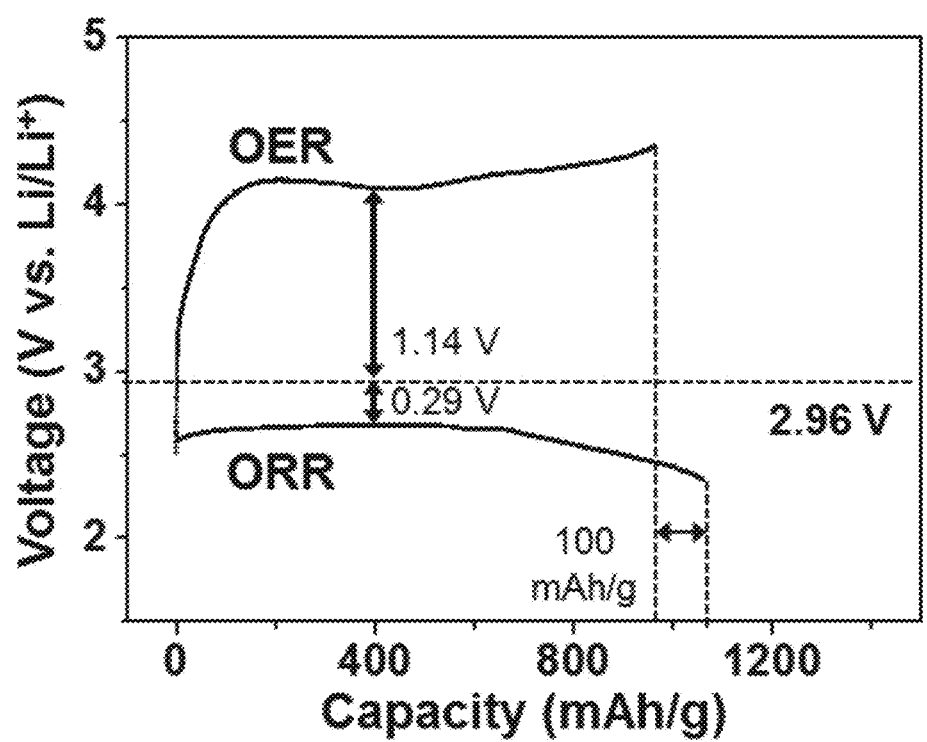
FIG. 13 is the initial charge and discharge curves of the current collector-catalyst monolithic electrode constituted by the polyimide nanofibers coated with a conductive catalyst layer (TiN) for Li-air batteries in Analysis Example 1 of the inventive concept.

FIG. 13 is a graph illustrating the initial charge and discharge curves of the current collector-catalyst monolithic air electrode having the single-layer core (polyimide nanofiber network)/shell (TiN) structure manufactured in Example 1. As illustrated in FIG. 13, the initial discharge capacity value of the TiN-coated polyimide nanofiber current collector-catalyst monolithic electrode was 1,100 mAh/g. The initial charge capacity value after the initial discharge was 1,000 mAh/g, and the initial irreversible capacity of the first cycle was about 100 mAh/g, exhibiting considerably excellent reversibility.

Figure 14:
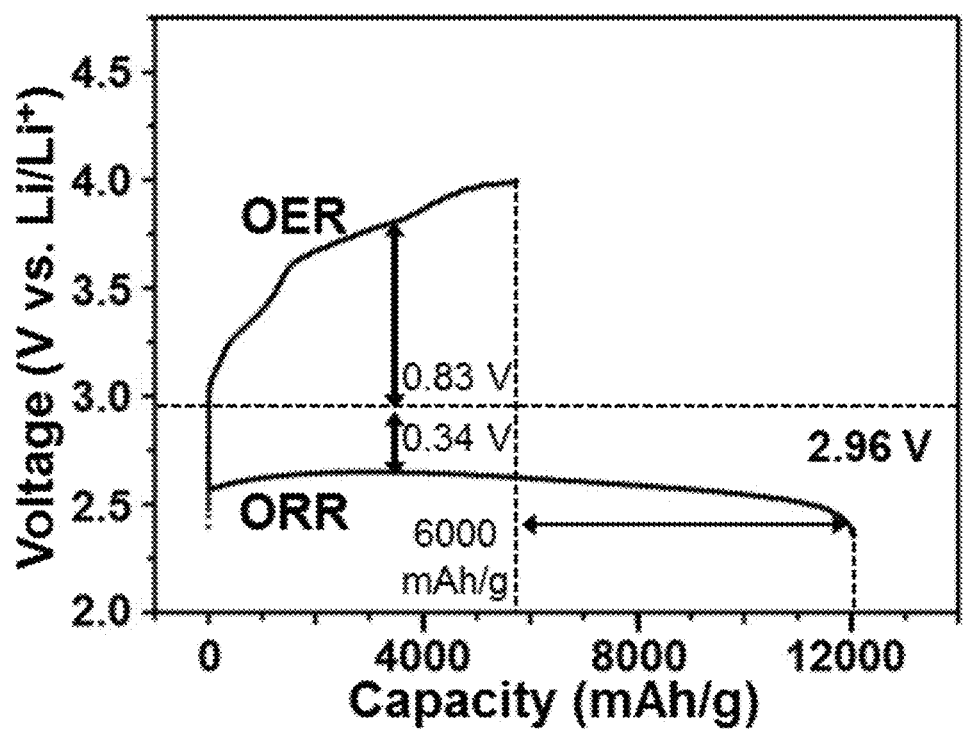
FIG. 14 is the initial charge and discharge curves of the current collector-catalyst monolithic electrode constituted by the polyimide nanofibers coated with a conductive catalyst layer (TiN) for Li-air batteries with respect to an electrolyte containing a soluble lithium iodide (LiI) catalyst in Analysis Example 1 of the inventive concept.

FIG. 14 is a graph illustrating the initial charge and discharge curves of the current collector-catalyst monolithic air electrode having the single-layer core (polyimide nanofiber network)/shell (TiN) structure for Li-air batteries with respect to an electrolyte containing lithium iodide (LiI) in Example 1 of the inventive concept. Lithium iodide (LiI) is a redox mediator of the oxidation-reduction reaction and used by dissolving in an electrolyte, and it has a feature to greatly lower the overpotential caused by the charge reaction because it can efficiently decompose lithium oxide. However, LiI corrodes the metal current collector such as nickel mesh and adversely affects the electrode when it spreads to the negative electrode through the membrane. When an electrolyte containing LiI was used, the initial discharge capacity value of the current collector-catalyst monolithic electrode having a single-layered core (polyimide nanofiber network)/shell (TiN) structure obtained in Example 1 was 12,000 mAh/g, but in contrast to the initial discharge capacity, the initial charge capacity was 6,000 mAh/g to exhibit a relatively high irreversible capacity. The high charge and discharge capacity values may be attributed to efficient formation and decomposition of lithium oxide by the LiI catalyst, and the lowered capacity value during charge may be attributed to the low electrical conductivity of polyimide. As observed in Analysis Example 1, from the fact that the initial discharge capacity value of the current collector-catalyst monolithic air electrode having a single-layered core (polyimide nanofiber network)/shell (TiN) structure has a high capacity, it has been confirmed that the penetration of the electrolyte and the diffusion of air effectively takes place through the pores between the nanofibers, and particularly the electrode exhibits superior electrochemical stability with respect to the LiI catalyst that is highly corrosive and the electrolyte that causes a side reaction with the electrode. Although TiN exhibits excellent electrical conductivity, in that the electrical conductivity value is a bit lower compared to a normal metal current collector, and thus it can be expected that not only the stability but also the catalytic activity and the efficiency of the air electrode can be maximized by forming a double layer composed of the first conductive coating layer (120) and the second catalytic coating layer (130).

Figure 15:
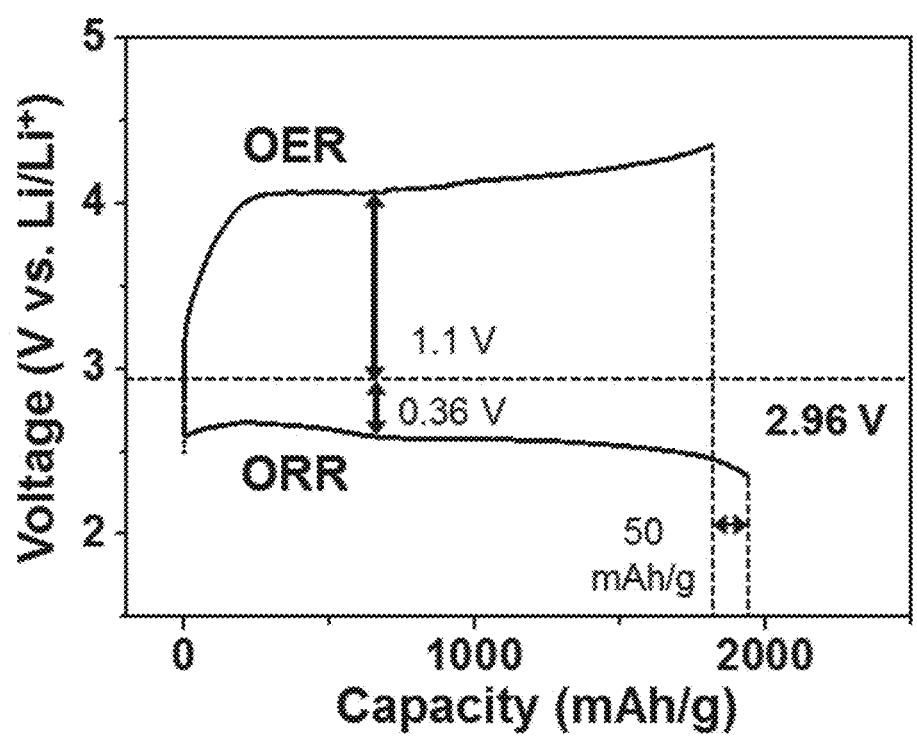
FIG. 15 is the initial charge and discharge curves of the current collector-catalyst monolithic electrode constituted by the carbon nanofibers coated with a conductive catalyst layer (TiN) for Li-air batteries in Analysis Example 1 of the inventive concept.

FIG. 15 is a graph illustrating the initial charge and discharge curves of the current collector-catalyst monolithic air electrode having a single-layered core (carbon nanofiber network)/shell (TiN) structure in Example 2 of the inventive concept. As illustrated in FIG. 15, the initial discharge capacity value of the TiN-coated porous three-dimensional carbon nanofiber current collector-catalyst monolithic electrode was 2,000 mAh/g. The initial charge capacity value after the initial discharge was about 1,950 mAh/g, and the initial irreversible capacity of the first cycle was about 50 mAh/g to exhibit considerably excellent reversibility. In consideration that the discharge capacity value of the current collector-catalyst monolithic air electrode having the single-layered core (polyimide nanofiber network)/shell (TiN) structure obtained in Example 1 is 1,000 mAh/g, it has been confirmed that a discharge capacity value of conductive carbon nanofibers as a center layer is two times higher than that of the air electrode obtained in Example 1.

Figure 16:
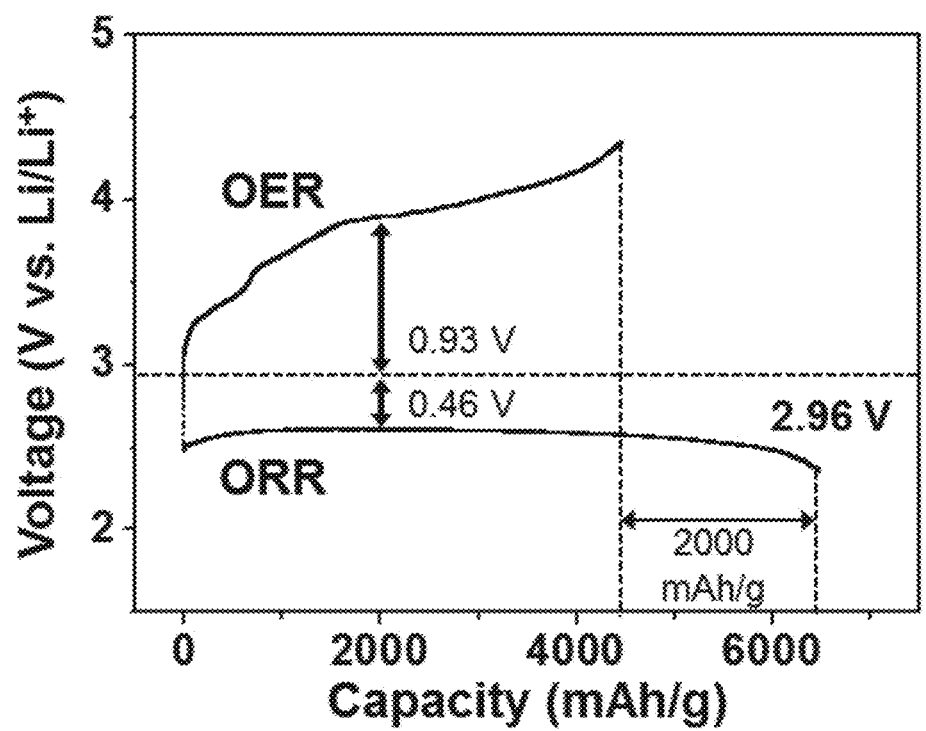
FIG. 16 is the initial charge and discharge curves of the current collector-catalyst monolithic electrode constituted by the carbon nanofibers coated with a conductive catalyst layer (TiN) for Li-air batteries with respect to an electrolyte containing a soluble lithium iodide (LiI) catalyst in Analysis Example 1 of the inventive concept.

FIG. 16 is the initial charge and discharge curves of the current collector-catalyst monolithic air electrode having a single-layer core (carbon nanofiber network)/shell (TiN) structure with respect to an electrolyte containing a lithium iodide (LiI) catalyst in Example 2 of the inventive concept. As shown in FIG. 16, the initial discharge capacity value of the TiN-coated porous three-dimensional carbon nanofiber current collector-catalyst monolithic electrode was 6,500 mAh/g. The initial charge capacity value after the initial discharge was about 4,500 mAh/g and the initial irreversible capacity of the first cycle was about 2,000 mAh/g to exhibit excellent reversibility. In consideration that the discharge capacity value of the current collector-catalyst monolithic air electrode having the single-layered core (polyimide nanofiber network)/shell (TiN) structure obtained in Example 1 with respect to an electrolyte containing a LiI catalyst is 12,000 mAh/g, the air electrode obtained in Example 2 exhibits favorable reversibility to be about three times better than that of the air electrode obtained in Example 1 as the conductive carbon nanofibers are used as the center layer although the initial discharge capacity value is relative lower, and it is expected that this fact may function as the main factor to exhibit long-cycle-life characteristics.

Analysis Example 2

Manufacture of air electrode of Li-air batteries using current collector-catalyst monolithic electrode having multilayered core (non-conductive polyimide nanofiber network)/shell (first coating layer-Al/second coating layer-Pd nanoparticle catalyst) structure (Example 4) and evaluation on electrochemical properties thereof The performance of the respective electrode was evaluated by the charge and discharge voltage curves of the Li-air batteries in order to investigate the catalytic activity and the electrolyte stability of the sample prepared in Example 4. For this purpose, the sample obtained in Example 4 was punched using a punching machine ($\phi$11.8), and the punched sample itself was used as the operating electrode to evaluate the electrochemical properties. The evaluation was conducted at a current density (0.2 mA/cm$^2$) with restricted capacity of 0.5 mA/cm$^2$ for evaluation.

Figure 17:
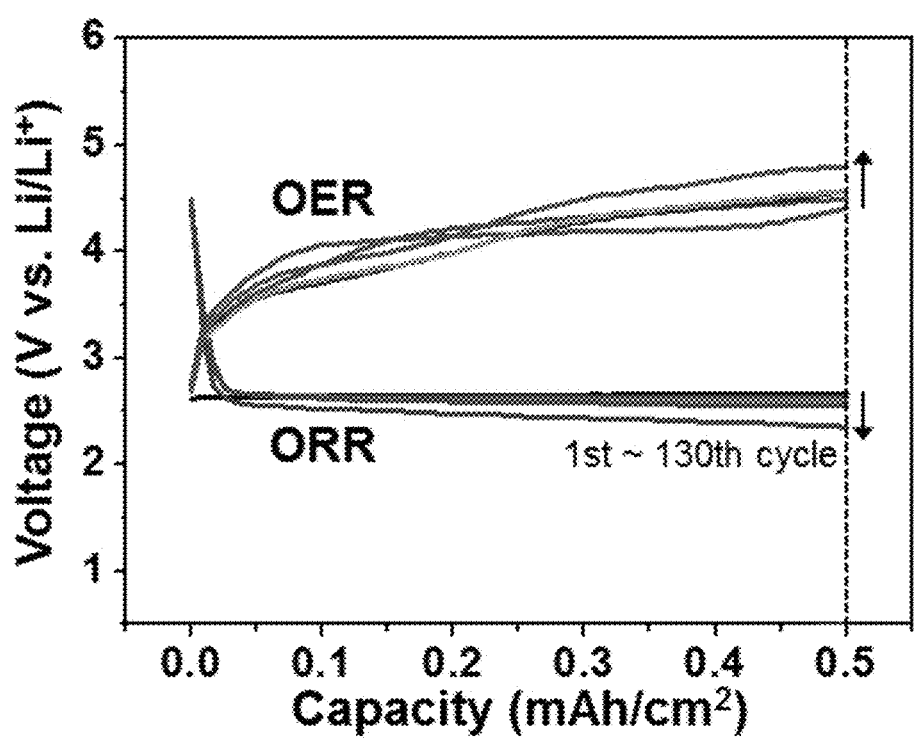
FIG. 17 is the charge and discharge curves of the current collector-catalyst monolithic electrode constituted by the polyimide nanofibers coated with a conductive metal layer (Al) and a nanoparticle catalyst layer (Pd) for Li-air batteries with respect to the cycles in Analysis Example 2 of the inventive concept.

FIG. 17 is the charge and discharge profiles of the current collector-catalyst monolithic air electrode having a multilayered core (polyimide nanofiber network)/shell (first coating layer-Al/second coating layer-Pd nanoparticle catalyst) structure manufactured in Example 4 with respect to the cycles. As shown in FIG. 17, the charge overpotential of the current collector-catalyst monolithic electrode of polyimide nanofibers coated with the conductive layer (Al) and the catalytic layer (Pd) is less than 4.5 V and 4.8 V for 80 and 130 cycles, respectively. In consideration that the current collector-catalyst monolithic air electrode having a multi-layered core (polyimide nanofiber network)/shell (first coating layer-Al/second coating layer-Pd nanoparticle catalyst) structure does not contains conductive carbon, it has been confirmed that excellent cycle-life are exhibited as highly conductive aluminum and Pd exhibiting excellent catalytic properties are used as the first coating layer and the second coating layer, respectively. It is expected that the air electrode may exhibit long-cycle-life because the side reaction product is significantly suppressed because the carbon is not contained in the air electrode, and thus excellent reversibility is observed.

While the inventive concept has been described with reference to exemplary embodiments, it will be apparent to those skilled in the technical field that various changes and modifications may be made without departing from the spirit and scope of the inventive concept. Therefore, it should be understood that the above embodiments are not limiting, but illustrative. The scope of the inventive concept is defined not by the detailed description of the inventive concept but by the appended claims, and all differences within the scope will be construed as being included in the inventive concept.

- 100: Schematic diagram of a nanofiber network-based current collector-catalyst monolithic electrode having a single-layered core (non-conductive nanofiber)/shell (conductive catalyst layer) structure for Li-air batteries
- 200: Schematic diagram of a nanofiber network-based current collector-catalyst monolithic electrode having a double-layered core (non-conductive nanofiber)/shell (conductive and non-conductive catalyst layers) structure for Li-air batteries
- 300: Schematic diagram of a nanofiber network-based current collector-catalyst monolithic electrode having a single-layered core (conductive nanofiber)/shell (conductive catalyst layer) structure for Li-air batteries
- 400: Schematic diagram of a nanofiber network-based current collector-catalyst monolithic electrode having a multilayered core (conductive nanofiber)/shell (non-conductive catalyst layer) structure for Li-air batteries
- 110: Nanofiber network (core) capable of serving as an internal support and a current collector at the same time
- 120: First coating layer (shell)
- 130: Second coating layer (shell)

What is claimed is:

1. A current collector-catalyst monolithic porous nanofiber network electrode comprising:
    a porous nanofiber network having a fabric-like structure formed by a plurality of coated nanofibers and a void space formed between the plurality of coated nanofibers, the plurality of coated nanofibers being randomly distributed throughout the fabric-like structure,
    wherein each of the coated nanofibers has a core-shell structure including a nanofiber as a center layer core and a single conductive catalyst layer coated as a uniform continuous thin film layer on a surface of the nanofiber as a shell, and
    wherein the single catalyst layer is made of TiN,
    wherein the single catalyst layer coated as a uniform continuous thin film layer has a thickness ranging from 1 to 35 nm
    a pore corresponding to the void space included in the porous nanofiber network has a diameter in a range of 10 nm to 200 μm.

2. The current collector-catalyst monolithic porous nanofiber network electrode according to claim 1, wherein the coated nanofibers include a highly heat-resistant polyimide nanofiber as the center layer for a stable subsequent process or treatment including a subsequent heat treatment or a high-temperature deposition process.

3. The current collector-catalyst monolithic porous nanofiber network electrode according to claim 1, wherein the porous nanofiber network includes a coated nanofiber having a diameter of 50 nm to 3 μm and a length is 100 μm or more.

4. The current collector-catalyst monolithic porous nanofiber network electrode according to claim 1, wherein the porous nanofiber network has a thickness in a range of 10 to 500 μm.

5. The current collector-catalyst monolithic porous nanofiber network electrode according to claim 1, wherein the center layer core includes one kind or two or more kinds of polymers of polyurethane, a polyurethane copolymer, cellulose acetate, cellulose, acetate butyrate, a cellulose derivative, polymethyl methacrylate (PMMA), polymethyl acrylate (PMA), a polyacrylic copolymer, a polyvinyl acetate copolymer, polyvinyl acetate (PVAc), polyvinylpyrrolidone (PVP), polyvinyl alcohol (PVA), polyfurfuryl alcohol (PPFA), polystyrene (PS), a polystyrene copolymer, polyethylene oxide (PEO), polypropylene oxide (PPO), a polyethylene oxide copolymer, a polypropylene oxide copolymer, polycarbonate (PC), polyvinyl chloride (PVC), polycaprolactone, polyvinyl fluoride, a polyvinylidene fluoride copolymer, polyimide, polyacrylonitrile (PAN), polyvinyl alcohol (PVA), polycarbonate (PC), polyaniline (PANI), polyvinyl chloride (PVC), poly(vinylidene fluoride) (PVDF), polyethylene terephthalate (PET), polypropylene (PP), or polyethylene (PE) when the center layer core is a non-conductive material.

6. The current collector-catalyst monolithic porous nanofiber network electrode according to claim 1, wherein the center layer core includes a highly conductive carbon-based nanofibers obtained by carbonization process of a nanofiber including one kind or two or more kinds of polymers of polyurethane, a polyurethane copolymer, cellulose acetate, cellulose, acetate butyrate, a cellulose derivative, polymethyl methacrylate (PMMA), polymethyl acrylate (PMA), a polyacrylic copolymer, a polyvinyl acetate copolymer, polyvinyl acetate (PVAc), polyvinylpyrrolidone (PVP), polyvinyl alcohol (PVA), polyfurfuryl alcohol (PPFA), polystyrene (PS), a polystyrene copolymer, polyethylene oxide (PEO), polypropylene oxide (PPO), a polyethylene oxide copolymer, a polypropylene oxide copolymer, polycarbonate (PC), polyvinyl chloride (PVC), polycaprolactone, polyvinyl fluoride, a polyvinylidene fluoride copolymer, polyimide, polyacrylonitrile (PAN), polyvinyl alcohol (PVA), polycarbonate (PC), polyaniline (PANI), polyvinyl chloride (PVC), poly(vinylidene fluoride) (PVDF), polyethylene terephthalate (PET), polypropylene (PP), or polyethylene (PE) to a high-temperature heat treatment or carbonization in a reducing atmosphere when the center layer core is a conductive material.

7. A three-dimensional current collector-catalyst monolithic porous nanofiber network electrode formed by multi-stacking, folding, or rolling the current collector-catalyst monolithic porous nanofiber network electrode according to claim 1.

8. The three-dimensional current collector-catalyst monolithic porous nanofiber network electrode according to claim 7, wherein the three-dimensional current collector-catalyst monolithic porous nanofiber network electrode has a volume in a range of 1 $cm^3$ to 1 $m^3$.

9. A Li-air battery comprising the current collector-catalyst monolithic porous nanofiber network electrode according to claim 1 as an air electrode.

10. An electrochemical system comprising the Li-air battery of claim 9.

* * * * *